(12) United States Patent
Xu et al.

(10) Patent No.: US 12,100,160 B2
(45) Date of Patent: Sep. 24, 2024

(54) EDGE DETECTION METHOD AND DEVICE, ELECTRONIC APPARATUS AND STORAGE MEDIUM

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glority Software Limited, Hangzhou (CN)

( * ) Notice: Subject to any disclaimer, the term of this patent is extended or adjusted under 35 U.S.C. 154(b) by 498 days.

(21) Appl. No.: 17/609,413

(22) PCT Filed: May 17, 2021

(86) PCT No.: PCT/CN2021/094204
§ 371 (c)(1),
(2) Date: Nov. 8, 2021

(87) PCT Pub. No.: WO2021/233266
PCT Pub. Date: Nov. 25, 2021

(65) Prior Publication Data
US 2022/0319012 A1  Oct. 6, 2022

(30) Foreign Application Priority Data
May 21, 2020 (CN) .......................... 202010436507.7

(51) Int. Cl.
*G06T 7/13* (2017.01)
*G06V 10/42* (2022.01)
*G06V 10/44* (2022.01)

(52) U.S. Cl.
CPC .............. *G06T 7/13* (2017.01); *G06V 10/42* (2022.01); *G06V 10/457* (2022.01); *G06T 2207/20081* (2013.01); *G06T 2207/20084* (2013.01)

(58) Field of Classification Search
None
See application file for complete search history.

(56) References Cited

U.S. PATENT DOCUMENTS

| 2018/0089833 A1* | 3/2018 | Lewis ...................... G06T 7/564 |
| 2021/0216766 A1* | 7/2021 | Luo ...................... G06V 30/416 |

(Continued)

FOREIGN PATENT DOCUMENTS

| CN | 110427932 | 11/2019 |
| CN | 110428414 | 11/2019 |

(Continued)

OTHER PUBLICATIONS

"International Search Report (Form PCT/ISA/210)"of PCT/CN2021/094204, mailed on Jul. 29, 2021, pp. 1-4.

(Continued)

*Primary Examiner* — Nancy Bitar
(74) *Attorney, Agent, or Firm* — JCIP GLOBAL INC.

(57) ABSTRACT

An edge detection method, an edge detection device, an electronic apparatus, and a storage medium are provided. The method includes: processing an input image to obtain a line drawing of grayscale contours, where the input image includes an object with edges, and the line drawing includes lines; merging the lines to obtain reference boundary lines; processing the input image to obtain boundary regions corresponding to the object; for each of the reference boundary lines, comparing the reference boundary line with the boundary regions, calculating a number of pixels on the reference boundary line belonging to the boundary regions to serve as a score of the reference boundary line to determine a plurality of scores corresponding to the reference boundary lines one-to-one; determining target boundary lines according to the reference boundary lines, the (Continued)

scores, and the boundary regions; and determining edges of the object according to the target boundary lines.

19 Claims, 7 Drawing Sheets

(56) References Cited

U.S. PATENT DOCUMENTS

| | | | | |
|---|---|---|---|---|
| 2022/0215557 A1* | 7/2022 | Xu | ............................ | G06T 7/168 |
| 2022/0319012 A1* | 10/2022 | Xu | ............................. | G06T 7/13 |
| 2023/0037272 A1* | 2/2023 | He | ...................... | G06V 30/1801 |

FOREIGN PATENT DOCUMENTS

| | | |
|---|---|---|
| CN | 111598074 | 8/2020 |
| CN | 111951290 | 11/2020 |
| JP | 2018028713 | 2/2018 |

OTHER PUBLICATIONS

"Written Opinion of the International Searching Authority (Form PCT/ISA/237)" of PCT/CN2021/094204, mailed on Jul. 29, 2021, pp. 1-6.

* cited by examiner

Long lines

Initial merged lines and unmerged long lines among long lines

Reference boundary line

First direction

EDGE DETECTION METHOD AND DEVICE, ELECTRONIC APPARATUS AND STORAGE MEDIUM

CROSS-REFERENCE TO RELATED APPLICATION

This application is a 371 of international application of PCT application serial no. PCT/CN2021/094204, filed on May 17, 2021, which claims the priority benefit of China application no. 202010436507.7, filed on May 21, 2020. The entirety of each of the above mentioned patent applications is hereby incorporated by reference herein and made a part of this specification.

TECHNICAL FIELD

The disclosure relates to an edge detection method, an edge detection device, an electronic apparatus, and a non-transitory computer-readable storage medium.

DESCRIPTION OF RELATED ART

Nowadays, people take pictures of objects (e.g., business cards, test papers, test sheets, documents, etc.) frequently with an aim to perform corresponding processing on the photographed images to obtain information related to the objects in the images. However, the photographed image not only includes the object, but also inevitably includes the external environment where the object is located. The part of the image corresponding to the external environment is superfluous for the information related to recognizing the object in the image. Therefore, when the image is processed to obtain the relevant information of the object in the image, the edges of the object need to be detected from the image, so that the object may be extracted from the image according to the edges of the object.

SUMMARY

At least one embodiment of the disclosure provides an edge detection method, and the method includes the following steps. An input image is processed to obtain a line drawing of grayscale contours in the input image. The input image includes an object with edges, and the line drawing includes a plurality of lines. The lines are merged to obtain a plurality of reference boundary lines. The input image is processed through a first boundary region recognition model to obtain a plurality of boundary regions corresponding to the object with edges. For each reference boundary line among the reference boundary lines, the reference boundary line is compared with the boundary regions, and a number of pixel points on the reference boundary line belonging to the boundary regions is counted and served as a score of the reference boundary line to determine a plurality of scores corresponding to the reference boundary lines one-to-one. A plurality of target boundary lines are determined according to the reference boundary lines, the scores, and the boundary regions. Edges of the object with edges in the input image are determined according to the determined target boundary lines.

Optionally, in the edge detection method provided by an embodiment of the disclosure, the step of comparing the reference boundary line with the boundary regions and counting and serving the number of pixel points on the reference boundary line belonging to the boundary regions as the score of the reference boundary line further includes the following steps. A boundary region matrix is determined according to the boundary regions. The reference boundary line is extended to obtain an extended reference boundary line. A line matrix is determined according to the extended reference boundary line. The line matrix is compared with the boundary region matrix, and a number of pixel points on the extended reference boundary line belonging to the boundary region matrix is counted to serve as the score of the reference boundary line. Sizes of the line matrix and the boundary region matrix are identical.

Optionally, in the edge detection method provided by an embodiment of the disclosure, the step of determining the line matrix according to the extended reference boundary line further includes the following steps. Position information of the pixel points in the extended reference boundary line is mapped to an image matrix. Values corresponding to the pixel points in extended reference boundary line in the image matrix are set to the first value and values corresponding to pixel points other than the pixel points in extended reference boundary line in the image matrix are set to the second value to form the line matrix.

Optionally, in the edge detection method provided by an embodiment of the disclosure, the step of determining the target boundary lines according to the reference boundary lines, the scores of the reference boundary lines, and the boundary regions further includes the following steps. The boundary regions are converted into a plurality of straight line groups. The straight line groups correspond to the boundary regions one-to-one, and each straight line group among the straight line groups includes at least one straight line. A plurality of average slopes corresponding to the straight line groups one-to-one are calculated. Slopes of the reference boundary lines are calculated. For an $i^{th}$ reference boundary line among the reference boundary lines, it is determined whether a difference between the slope of the $i^{th}$ reference boundary line and the average slope among the average slopes corresponding to the $i^{th}$ reference boundary line is greater than a first slope threshold, wherein i is a positive integer, and i is less than or equal to a number of the reference boundary lines. In response to the difference between the slope of the $i^{th}$ reference boundary line and the average slope corresponding to the $i^{th}$ reference boundary line being lower than or equal to the first slope threshold, the $i^{th}$ reference boundary line is determined to be a target reference boundary line to determine a plurality of target reference boundary lines among the reference boundary lines. A plurality of intermediate target boundary lines are determined according to the scores of the reference boundary lines corresponding to the target reference boundary lines. The target boundary lines are determined according to intermediate target boundary lines.

Optionally, in the edge detection method provided by an embodiment of the disclosure, the boundary regions include a first boundary region, a second boundary region, a third boundary region, and a fourth boundary region. The reference boundary lines include a first reference boundary line group corresponding to the first boundary region, a second reference boundary line group corresponding to the second boundary region, a third reference boundary line group corresponding to the third boundary region, and a fourth reference boundary line group corresponding to the fourth boundary region. The method further includes the following steps. The method responds to differences between the slopes of all reference boundary lines in a selected reference boundary line group of the reference boundary lines and the average slope corresponding to the selected reference boundary line group being all greater than the first slope threshold. The selected reference boundary line group is the first reference boundary line group, the second reference boundary line group, the third reference boundary line group, or the fourth reference boundary line group. A selected boundary region corresponding to the selected reference boundary line group is obtained. The selected boundary region is the first boundary region, the second boundary region, the third boundary region, or the fourth boundary region. According to the straight line group corresponding to the selected boundary region, a median of the straight line group corresponding to the selected boundary region is determined, and the median is determined to act as the target boundary line corresponding to the selected boundary region.

Optionally, in the edge detection method provided by an embodiment of the disclosure, the step of determining the target boundary lines according to intermediate target boundary lines further includes the following steps. For a $k^{th}$ intermediate target boundary line among the intermediate target boundary lines, coincidence degree judgment is performed on the $k^{th}$ intermediate target boundary line to determine whether the $k^{th}$ intermediate target boundary line is a target boundary line. The step of performing the coincidence degree judgment on the $k^{th}$ intermediate target boundary line further includes the following steps. A ratio of pixel points of the $k^{th}$ intermediate target boundary line falling into the boundary region corresponding to the $k^{th}$ intermediate target boundary line to all pixel points of the $k^{th}$ intermediate target boundary line is calculated, where k is a positive integer, and k is less than or equal to a number of the intermediate target boundary lines. It is determined whether the ratio is greater than or equal to a ratio threshold. In response to the ratio being greater than or equal to the ratio threshold, the $k^{th}$ intermediate target boundary line is determined to be the target boundary line, and coincidence degree judgment is performed on the intermediate target boundary lines to determine the target boundary lines. In response to the ratio being less than the ratio threshold, the $k^{th}$ intermediate target boundary line is deleted, and the coincidence degree judgment is continuously performed on any intermediate target boundary line among the intermediate target boundary lines except the $k^{th}$ intermediate target boundary line.

Optionally, in the edge detection method provided by an embodiment of the disclosure, the step of converting the boundary regions into the straight line groups further includes the following step. Hough transform is applied to convert the boundary regions into the straight line groups.

Optionally, in the edge detection method provided by an embodiment of the disclosure, the step of processing the input image to obtain the line drawing of grayscale contours in the input image further includes the following step. The input image is processed through an edge detection algorithm to obtain the line drawing of grayscale contours in the input image.

Optionally, in the edge detection method provided by an embodiment of the disclosure, the step of processing the input image to obtain the line drawing of grayscale contours in the input image further includes the following steps. The input image is processed through a second boundary region recognition model to obtain the boundary regions. The boundary regions are processed through an edge detection algorithm to obtain the line drawing of grayscale contours in the input image.

Optionally, in the edge detection method provided by an embodiment of the disclosure, the reference boundary lines are divided into a plurality of reference boundary line groups corresponding to the boundary regions one-to-one, and each reference boundary line group among the reference boundary line groups includes at least one reference boundary line. The step of merging the lines to obtain the reference boundary lines further includes the following steps. Similar lines among the lines are merged to obtain a plurality of initial merged line groups. The initial merged line groups correspond to the boundary regions one-to-one, and each initial merged line group among the initial merged line groups includes at least one initial merged line. A plurality of boundary connecting lines are determined according to the initial merged line groups. The boundary connecting lines correspond to the boundary regions one-to-one, and the boundary connecting lines also correspond to the initial merged line groups one-to-one as well. The boundary regions are converted into a plurality of straight line groups. The straight line groups correspond to the boundary regions one-to-one, and each straight line group among the straight line groups includes at least one straight line. A plurality of average slopes corresponding to the straight line groups one-to-one are calculated. Slopes of the boundary connecting lines are calculated. For a $b1^{th}$ boundary connecting line among the boundary connecting lines, it is determined whether a difference between the slope of the $b1^{th}$ boundary connecting line and the average slope among the average slopes corresponding to the $b1^{th}$ boundary connecting line is greater than a second slope threshold, where b1 is a positive integer, and b1 is less than or equal to a number of the boundary connecting lines. In response to the difference between the slope of the $b1^{th}$ boundary connecting line and the average slope corresponding to the $b1^{th}$ boundary connecting line being less than or equal to the second slope threshold, the $b1^{th}$ boundary connecting line and the initial merged line in the initial merged line group corresponding to the $b1^{th}$ boundary connecting line are served as the reference boundary lines in the reference boundary line group corresponding to the boundary region corresponding to the $b1^{th}$ boundary connecting line. In response to the difference between the slope of the $b1^{th}$ boundary connecting line and the average slope corresponding to the $b1^{th}$ boundary connecting line being greater than the second slope threshold, the initial merged line in the initial merged line group corresponding to the $b1^{th}$ boundary connecting line is served as the reference boundary line in the reference boundary line group corresponding to the boundary region corresponding to the $b1^{th}$ boundary connecting line to determine the reference boundary lines.

Optionally, in the edge detection method provided by an embodiment of the disclosure, the step of merging the similar lines among the lines to obtain the initial merged line groups further includes the following step. A plurality of long lines among the lines are acquired. Each long line among the long lines is a line whose length exceeds a length threshold. A plurality of merged line groups are obtained according to the long lines. Each merged line group among the merged line groups includes at least two successively adjacent long lines, and an angle between any two adjacent long lines in each merged line group is less than an angle threshold. For each merged line group among the merged line groups, the long lines in the merged line group are sequentially merged to obtain an initial merged line corresponding to the merged line group, and the merged line groups are merged to determine the initial merged lines in the initial merged line groups.

Optionally, in the edge detection method provided by an embodiment of the disclosure, the step of determining the boundary connecting lines according to the initial merged line groups further includes the following step. For a b2$^{th}$ initial merged line group among the initial merged line groups, the initial merged lines in the b2$^{th}$ initial merged line group are sorted according to an arrangement direction of the initial merged lines in the b2$^{th}$ initial merged line group to determine a first initial merged line and a last initial merged line in the b2$^{th}$ initial merged line group. A start point of the first initial merged line is connected to an end point of the last initial merged line to obtain the boundary connecting line corresponding to the b2$^{th}$ initial merged line group to determine the boundary connecting lines, where b2 is a positive integer, and b2 is less than or equal to a number of the initial merged line groups.

Optionally, the edge detection method provided by an embodiment of the disclosure further includes the following steps. A plurality of intersection points of the target boundary lines are obtained, and perspective transformation is performed on regions determined by the intersection points and the target boundary lines to obtain a front view of the object with edges in the input image.

At least one embodiment of the disclosure further provides an edge detection device including an acquisition module, a merging module, a recognition module, a score calculation module, a first determination module, and a second determination module. The acquisition module is configured for processing an input image to obtain a line drawing of grayscale contours in the input image. The input image includes an object with edges, and the line drawing includes a plurality of lines. The merging module is configured for merging the lines to obtain a plurality of reference boundary lines. The recognition module is configured for processing the input image through a first boundary region recognition model to obtain a plurality of boundary regions corresponding to the object with edges. For each reference boundary line among the reference boundary lines, the score calculation module is configured for comparing the reference boundary line with the boundary regions and counting and serving a number of pixel points on the reference boundary line belonging to the boundary regions as a score of the reference boundary line to determine a plurality of scores corresponding to the reference boundary lines one-to-one. The first determination module is configured for determining a plurality of target boundary lines according to the reference boundary lines, the scores, and the boundary regions. The second determination module is configured for determining edges of the object with edges according to the determined target boundary lines.

Optionally, in the edge detection device provided by an embodiment of the disclosure, when the score calculation module compares the reference boundary line with the boundary regions and counts and serves the number of pixel points on the reference boundary line belonging to the boundary regions as the score of the reference boundary line, the score calculation module is further configured to perform the following operations. A boundary region matrix is determined according to the boundary regions. The reference boundary line is extended to obtain an extended reference boundary line. A line matrix is determined according to the extended reference boundary line. The line matrix is compared with the boundary region matrix, and a number of pixel points on the extended reference boundary line belonging to the boundary region matrix is counted to serve as the score of the reference boundary line. Sizes of the line matrix and the boundary region matrix are identical.

Optionally, in the edge detection device provided by an embodiment of the disclosure, the first determination module determines the target boundary lines according to the reference boundary lines, the scores of the reference boundary lines, and the boundary regions, and the first determination module is further configured to performed the following operations. The boundary regions are converted into a plurality of straight line groups. The straight line groups correspond to the boundary regions one-to-one, and each straight line group among the straight line groups includes at least one straight line. A plurality of average slopes corresponding to the straight line groups one-to-one are calculated. Slopes of the reference boundary lines are calculated. For an i$^{th}$ reference boundary line among the reference boundary lines, it is determined whether a difference between the slope of the i$^{th}$ reference boundary line and the average slope among the average slopes corresponding to the i$^{th}$ reference boundary line is greater than a first slope threshold, where i is a positive integer, and i is less than or equal to a number of the reference boundary lines. In response to the difference between the slope of the i$^{th}$ reference boundary line and the average slope corresponding to the i$^{th}$ reference boundary line being lower than or equal to the first slope threshold, the i$^{th}$ reference boundary line is determined to be a target reference boundary line to determine a plurality of target reference boundary lines among the reference boundary lines. A plurality of intermediate target boundary lines are determined according to the scores of the reference boundary lines corresponding to the target reference boundary lines. The target boundary lines are determined according to intermediate target boundary lines.

Optionally, in the edge detection device provided by an embodiment of the disclosure, the boundary regions include a first boundary region, a second boundary region, a third boundary region, and a fourth boundary region. The reference boundary lines include a first reference boundary line group corresponding to the first boundary region, a second reference boundary line group corresponding to the second boundary region, a third reference boundary line group corresponding to the third boundary region, and a fourth reference boundary line group corresponding to the fourth boundary region. The first determination module is further configured to perform the following steps. The module responds to differences between the slopes of all reference boundary lines in a selected reference boundary line group of the reference boundary lines and the average slope corresponding to the selected reference boundary line group being all greater than the first slope threshold. The selected reference boundary line group is the first reference boundary line group, the second reference boundary line group, the third reference boundary line group, or the fourth reference boundary line group. A selected boundary region corresponding to the selected reference boundary line group is obtained. The selected boundary region is the first boundary region, the second boundary region, the third boundary region, or the fourth boundary region. According to the straight line group corresponding to the selected boundary region, a median of the straight line group corresponding to the selected boundary region is determined, and the median is determined to act as the target boundary line corresponding to the selected boundary region.

Optionally, in the edge detection device provided by an embodiment of the disclosure, when the first determination module determines the target boundary lines according to the intermediate target boundary lines, and the first determination module is further configured to perform the following operations. For a k$^{th}$ intermediate target boundary line among the intermediate target boundary lines, coincidence degree judgment is performed on the k$^{th}$ intermediate target boundary line to determine whether the k$^{th}$ intermediate target boundary line is a target boundary line. The step of performing the coincidence degree judgment on the $k^{th}$ intermediate target boundary line further includes the following steps. A ratio of pixel points of the $k^{th}$ intermediate target boundary line falling into the boundary region corresponding to the $k^{th}$ intermediate target boundary line to all pixel points of the $k^{th}$ intermediate target boundary line is calculated, where k is a positive integer, and k is less than or equal to a number of the intermediate target boundary lines. It is determined whether the ratio is greater than or equal to a ratio threshold. In response to the ratio being greater than or equal to the ratio threshold, the $k^{th}$ intermediate target boundary line is determined to be the target boundary line, and coincidence degree judgment is performed on the intermediate target boundary lines to determine the target boundary lines. In response to the ratio being less than the ratio threshold, the $k^{th}$ intermediate target boundary line is deleted, and the coincidence degree judgment is continuously performed on any intermediate target boundary line among the intermediate target boundary lines except the $k^{th}$ intermediate target boundary line.

Optionally, in the edge detection device provided by an embodiment of the disclosure, the reference boundary lines are divided into a plurality of reference boundary line groups corresponding to the boundary regions one-to-one, and each reference boundary line group among the reference boundary line groups includes at least one reference boundary line. When the merging module merges the lines to obtain the reference boundary lines, the merging module is further configured to perform the following operations. Similar lines among the lines are merged to obtain a plurality of initial merged line groups. The initial merged line groups correspond to the boundary regions one-to-one, and each initial merged line group among the initial merged line groups includes at least one initial merged line. A plurality of boundary connecting lines are determined according to the initial merged line groups. The boundary connecting lines correspond to the boundary regions one-to-one, and the boundary connecting lines also correspond to the initial merged line groups one-to-one as well. The boundary regions are converted into a plurality of straight line groups. The straight line groups correspond to the boundary regions one-to-one, and each straight line group among the straight line groups includes at least one straight line. A plurality of average slopes corresponding to the straight line groups one-to-one are calculated. Slopes of the boundary connecting lines are calculated. For a $b1^{th}$ boundary connecting line among the boundary connecting lines, it is determined whether a difference between the slope of the $b1^{th}$ boundary connecting line and the average slope among the average slopes corresponding to the $b1^{th}$ boundary connecting line is greater than a second slope threshold, where b1 is a positive integer, and b1 is less than or equal to a number of the boundary connecting lines. In response to the difference between the slope of the $b1^{th}$ boundary connecting line and the average slope corresponding to the $b1^{th}$ boundary connecting line being less than or equal to the second slope threshold, the $b1^{th}$ boundary connecting line and the initial merged line in the initial merged line group corresponding to the $b1^{th}$ boundary connecting line are served as the reference boundary lines in the reference boundary line group corresponding to the boundary region corresponding to the $b1^{th}$ boundary connecting line. In response to the difference between the slope of the $b1^{th}$ boundary connecting line and the average slope corresponding to the $b1^{th}$ boundary connecting line being greater than the second slope threshold, the initial merged line in the initial merged line group corresponding to the $b1^{th}$ boundary connecting line is served as the reference boundary line in the reference boundary line group corresponding to the boundary region corresponding to the $b1^{th}$ boundary connecting line to determine the reference boundary lines.

At least one embodiment of the disclosure further provides an electronic apparatus including a processor and a memory. The memory is configured to store a computer-readable instruction. The processor is configured to implement the steps of the method according to any one of the abovementioned embodiments when executing the computer-readable instruction.

At least one embodiment of the disclosure further provides a non-transitory computer-readable storage medium. The non-transitory computer-readable storage medium is configured for non-transitory storage of a computer-readable instruction, and the computer-readable instruction is configured to implement the steps of the method according to any one of the abovementioned embodiments when being executed by a processor.

BRIEF DESCRIPTION OF THE DRAWINGS

In order to explain the technical solutions of the embodiments of the disclosure more clearly, the accompanying drawings of the embodiments will be briefly introduced below. Obviously, the accompanying drawings in the following description only relate to some embodiments of the disclosure, rather than limit the disclosure.

DESCRIPTION OF THE EMBODIMENTS

Figure 1:
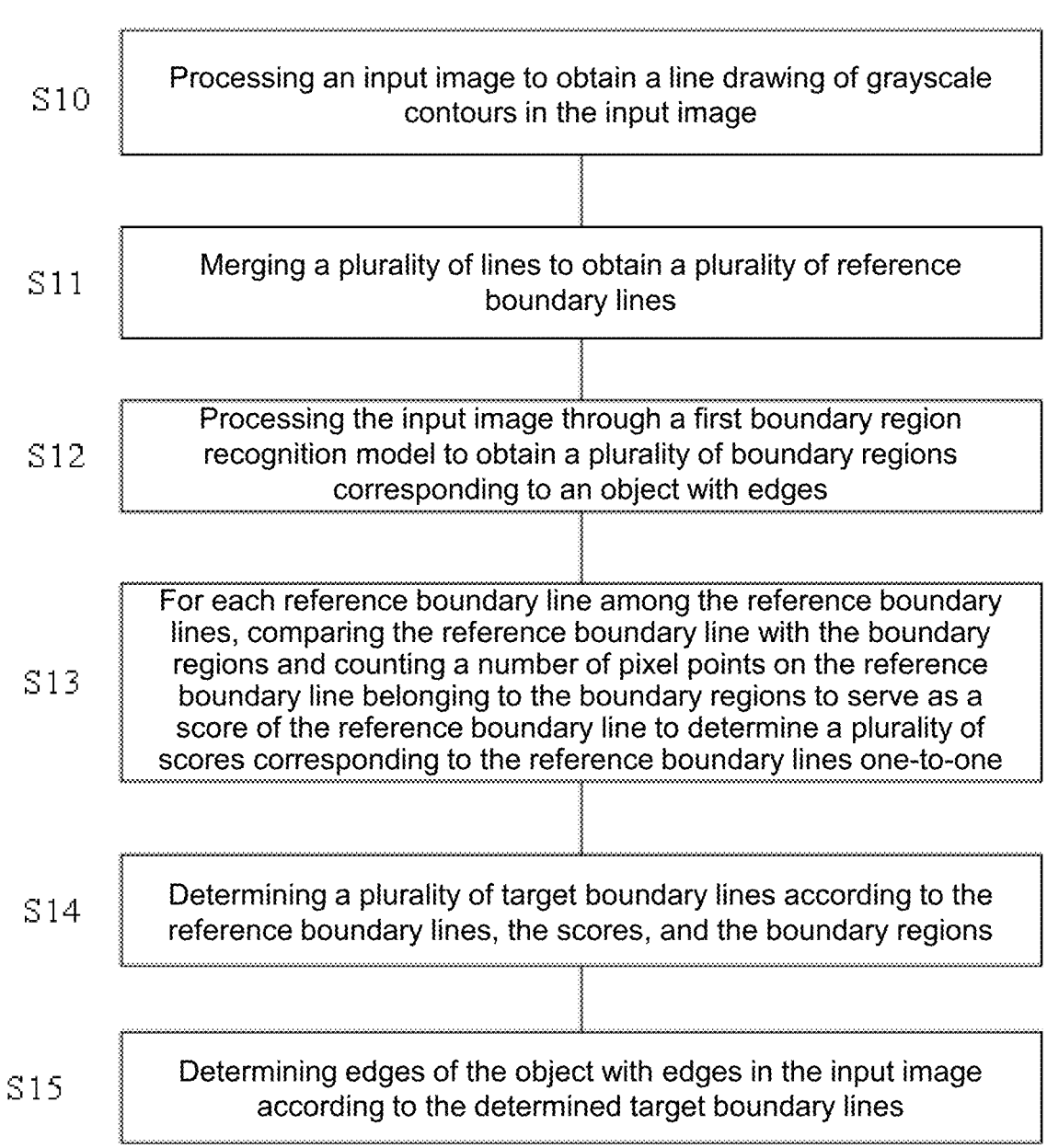
FIG. 1 is schematic flow chart of an edge detection method according to at least one embodiment of the disclosure.

To better illustrate the goal, technical solutions, and advantages of the disclosure, the accompanying drawings in the embodiments of the disclosure are included to provide a clear and complete description of the technical solutions provided in the embodiments of the disclosure. Obviously, the described embodiments are merely part of the embodiments, rather than all of the embodiments, of the disclosure. Based on the embodiments describing the disclosure, all other embodiments obtained by a person having ordinary skill in the art without making any inventive effort fall within the scope that the disclosure seeks to protect.

Unless otherwise defined, the technical terms or scientific terms used in the disclosure shall have the usual meanings understood by a person having ordinary skill in the art. The "first", "second", and similar words used in the disclosure do not indicate any order, quantity or importance, but are only used to distinguish different components. "Include" or "comprise" and other similar words mean that the element or item appearing before the word covers the elements or items listed after the word and their equivalents, but does not exclude other elements or items. "Connection" or "conjunction" and other similar words are not limited to physical or mechanical connections, but may include electrical connections, whether direct or indirect. "Up", "down", "left", "right", etc. are only used to indicate relative positional relationships. When the absolute position of the described object changes, the relative position relationship may also change accordingly. In order to keep the following description of the embodiments of the disclosure clear and concise, detailed description of some known functions and known components is omitted in the disclosure.

At least one embodiment of the disclosure provides an edge detection method, an edge detection device, an electronic apparatus, and a non-transitory computer-readable storage medium. The edge detection method includes the following steps. An input image is processed to obtain a line drawing of grayscale contours in the input image. The input image includes an object with edges, and the line drawing includes a plurality of lines. The lines are merged to obtain a plurality of reference boundary lines. The input image is processed through a first boundary region recognition model to obtain a plurality of boundary regions corresponding to the object with edges. For each reference boundary line among the reference boundary lines, the reference boundary line is compared with the boundary regions, and a number of pixel points on the reference boundary line belonging to the boundary regions is counted and served as a score of the reference boundary line to determine a plurality of scores corresponding to the reference boundary lines one-to-one. A plurality of target boundary lines are determined according to the reference boundary lines, the scores, and the boundary regions. Edges of the object with edges in the input image are determined according to the determined target boundary lines.

In the edge detection method provided by the embodiments of the disclosure, first, the line drawing of grayscale contours in the input image is obtained, and similar lines in the line drawing are then merged to obtain the reference boundary lines. Further, the input image is processed through the pre-trained first boundary region recognition model to obtain the boundary regions corresponding to the object with edges. Based on the number of pixel points on the reference boundary line belonging to the boundary regions, the score of each reference boundary line is then determined. Next, the target boundary lines are determined according to the scores of the reference boundary lines and the boundary regions, and the edges of the object with edges (i.e., an object in the input image, e.g., a business card and a piece of test paper, test sheet, and document, etc.) in the input image are further determined according to the target boundary lines. In the edge detection method, the reference boundary lines are obtained according to the input image, and machine learning is then combined to recognize the boundary regions, so the target boundary lines of the object with edges in the input image may thereby be determined together through the reference boundary lines and the boundary regions. In this way, positions of the edges of the object with edges in the input image may be quickly located, and edge detection of the object with edges in the input image may thus be implemented. Besides, the accuracy of edge detection is improved.

The edge detection method provided by the embodiments of the disclosure may be applied to the edge detection device provided by the embodiments of the disclosure, and the edge detection device may be disposed on the electronic apparatus. The electronic apparatus may be a personal computer, a mobile terminal, etc., and the mobile terminal may be a hardware apparatus such as a mobile phone or a tablet computer.

The embodiments of the disclosure will be described in detail below with reference to the accompanying drawings, but the disclosure is not limited to these specific embodiments.

Figure 2A:
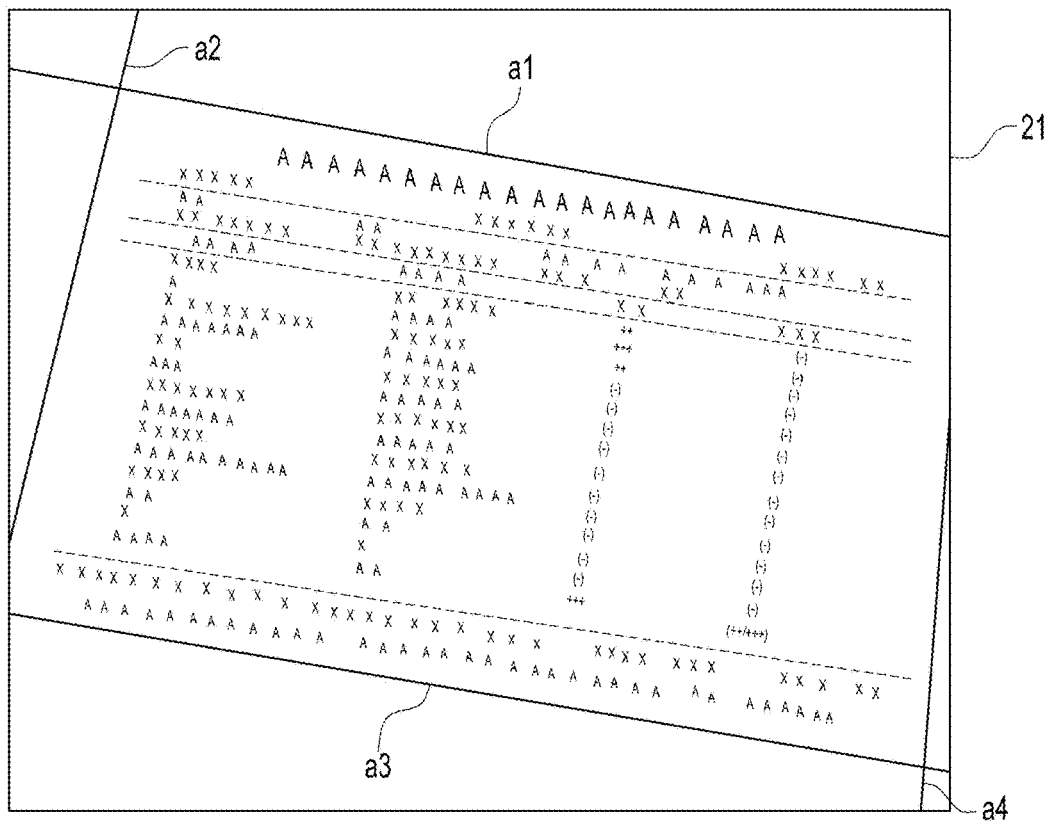
FIG. 2A to FIG. 2C are schematic images of an input image according to an embodiment of the disclosure.
Figure 2B:
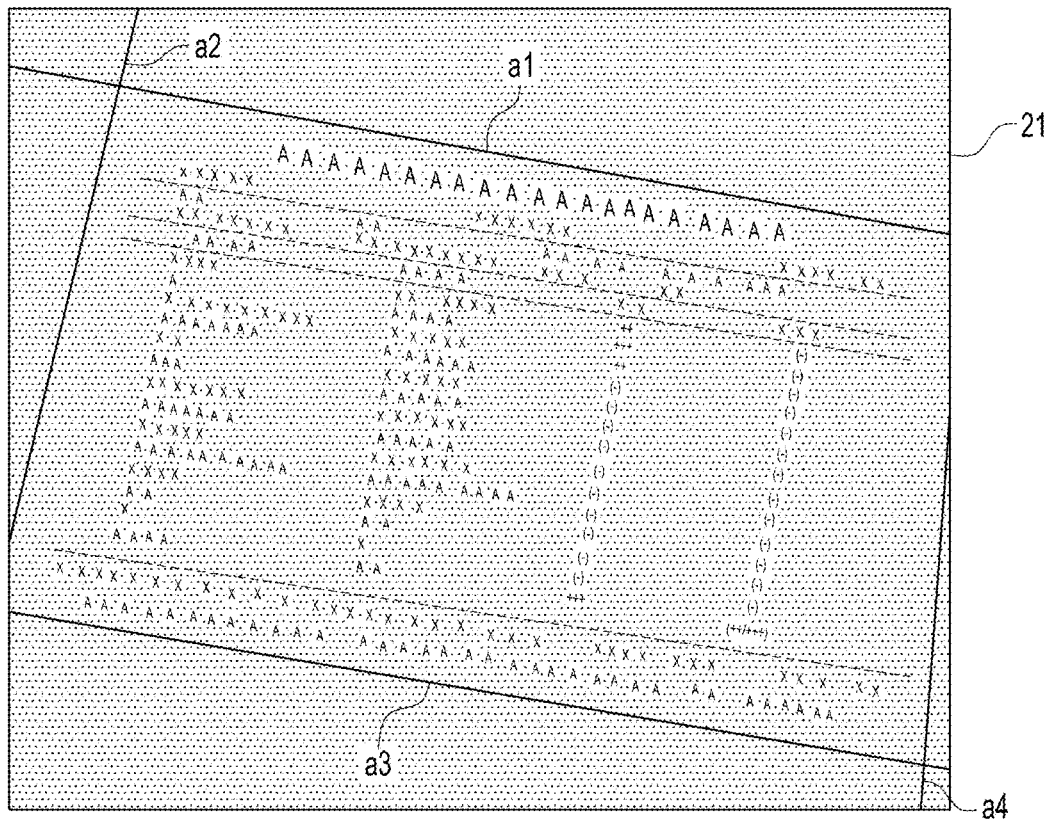
Figures 2C, 3A:
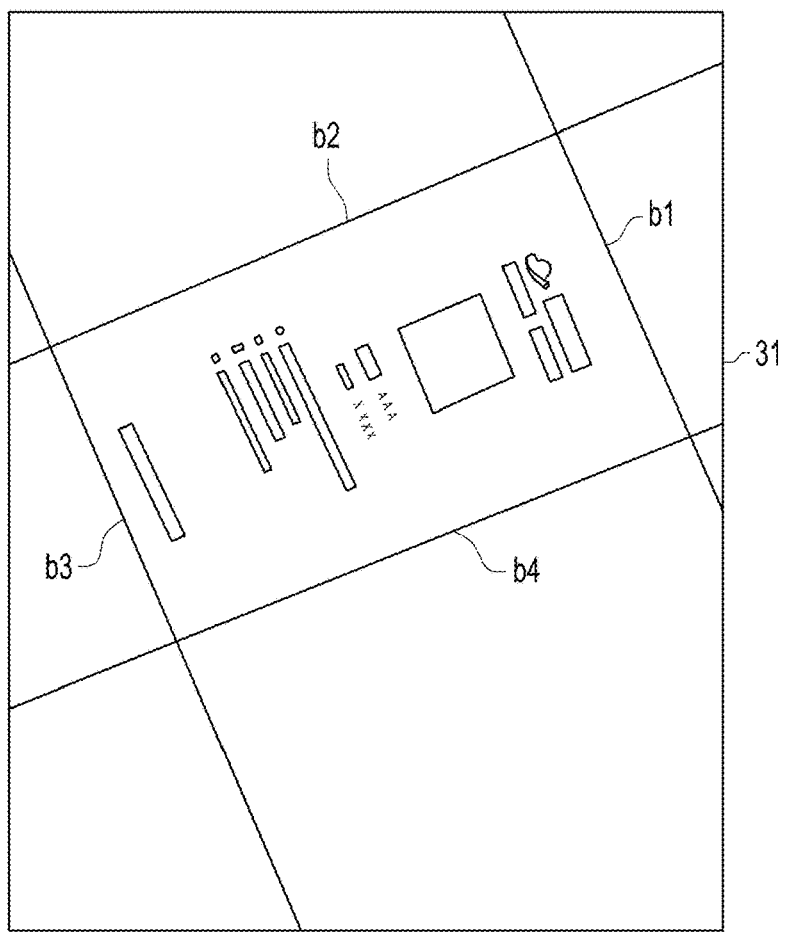
FIG. 3A to FIG. 3C are schematic images of another input image according to an embodiment of the disclosure.
Figure 3B:
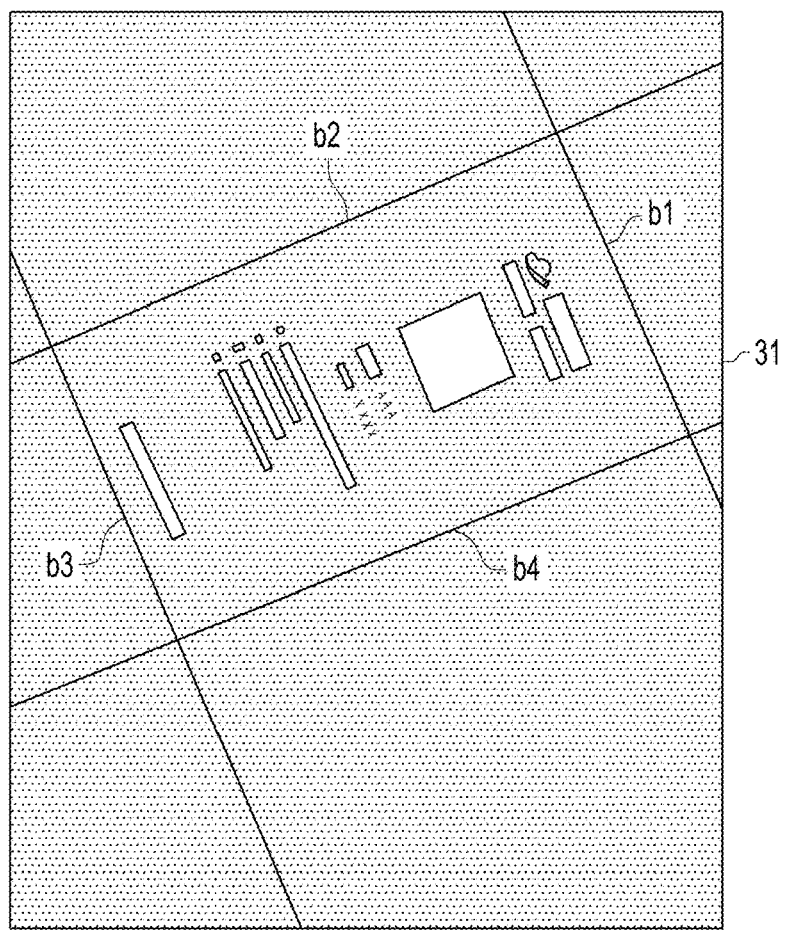
Figure 3C:
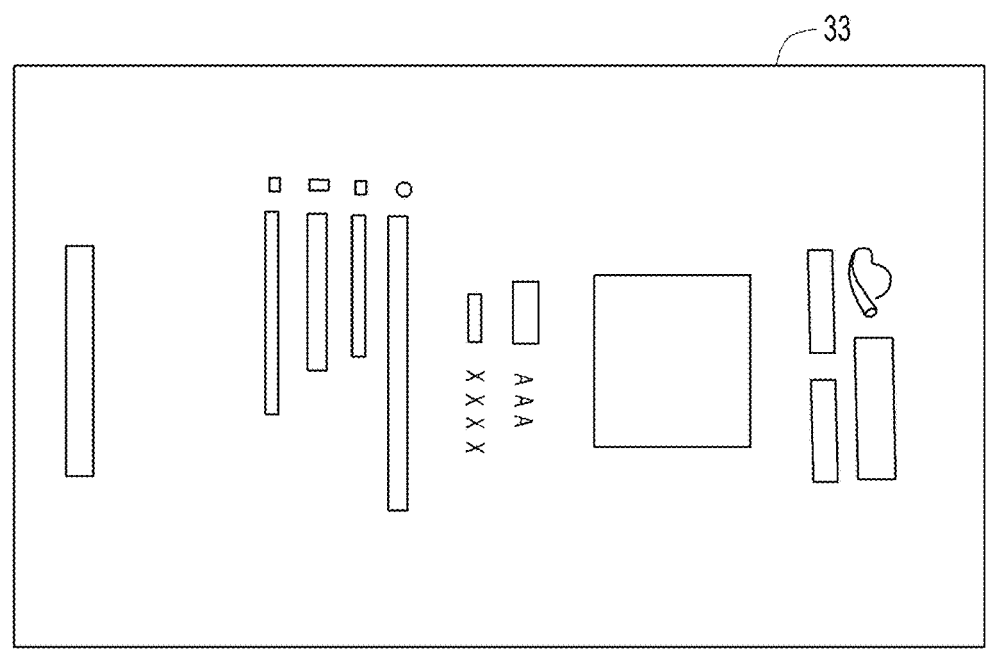

FIG. 1 is schematic flow chart of an edge detection method according to at least one embodiment of the disclosure. FIG. 2A to FIG. 2C are schematic images of an input image according to an embodiment of the disclosure. FIG. 3A to FIG. 3C are schematic images of another input image according to an embodiment of the disclosure.

As shown in FIG. 1, the edge detection method provided by an embodiment of the disclosure includes steps S10 to S15. First, in step S10, an input image is processed to obtain a line drawing of grayscale contours in the input image.

For instance, the input image includes an object with edges, the line drawing includes a plurality of lines, and the line drawing is a grayscale drawing.

For instance, the input image may be an image which is obtained by a user through taking a photo of an object, and the object may be, for example, a business card and a piece of test paper, test sheet, document, and invoice, and the like. As shown in FIG. 2A, in some embodiments, the input image 21 may be an image obtained by taking a photo of the test sheet. As shown in FIG. 3A, in some embodiments, the input image 31 may be an image obtained by taking a photo of the business card.

A shape of an object to be recognized in the input image may be a regular shape (e.g., a rectangle) or may be an irregular shape. As shown in FIG. 2A and FIG. 2B, the shape of the test sheet and the shape of the business card are both rectangular. Note that in the disclosure, "the shape of the object" means the general shape of the object. For instance, when the shape of the object is a rectangle, each side of the rectangle may not be a straight line segment, but may be a line segment with a small wave shape, a zigzag shape, etc. in the input image.

The shape of the input image may also be a rectangle or the like. The shape and size of the input image may be configured by the user according to actual situations.

The input image may be an image captured by a digital camera or a mobile phone, and the input image may be a grayscale image or a color image. For instance, the input image may be an original image directly acquired by an image acquisition device or an image which is obtained after the original image is pre-processed. For instance, in order to prevent the edge detection of the object from being affected by data quality and data imbalance of the input image, before the input image is processed, the input image may be pre-processed in the edge detection method. Preprocessing may eliminate irrelevant information or noise information in the input image, so as to better process the input image.

In some embodiments, step S10 may further includes the following step. The input image is processed through an edge detection algorithm to obtain the line drawing of grayscale contours in the input image. For instance, the input image may be processed through an edge detection algorithm based on OpenCV to obtain the line drawing of grayscale contours in the input image. OpenCV is an open source computer vision library. Edge detection algorithms based on OpenCV include Sobel, Scarry, Canny, Laplacian, Prewitt, Marr-Hildresh, scharr, and many other algorithms. For instance, the Canny edge detection algorithm is used in this embodiment, and the Canny edge detection algorithm is a multi-stage algorithm, that is, the Canny edge detection algorithm consists of a plurality of steps. For instance, the Canny edge detection algorithm includes: 1. image denoising: use of the Gaussian filter to smooth the image; 2. image gradient calculation: use of the first-order partial derivative finite difference to calculate the gradient amplitude and direction; 3. non-maximum suppression: non-maximum suppression of the gradient amplitude; 4. threshold screening: use of a dual-threshold algorithm to detect and connect edges.

In some other embodiments, step S10 may further include the following steps. The input image is processed through a second boundary region recognition model to obtain the boundary regions. The boundary regions are processed through an edge detection algorithm to obtain the line drawing of grayscale contours in the input image.

In this embodiment, the step of processing the boundary regions through the edge detection algorithm to obtain the line drawing of grayscale contours in the input image further includes the following steps. The boundary regions are processed to obtain a plurality of boundary region labeling frames. The boundary region labeling frames are processed through the edge detection algorithm to obtain the line drawing of grayscale contours in the input image.

The second boundary region recognition model may be implemented through the machine learning technology and may run on, for example, a general-purpose computing apparatus or a dedicated computing apparatus. The second boundary region recognition model is a neural network model obtained through pre-training. For instance, the second boundary region recognition model may be implemented by using a neural network such as a deep convolutional neural network (DEEP-CNN). In some embodiments, the input image is inputted into the second boundary region recognition model, and the second boundary region recognition model may recognize the edges of the object with edges in the input image to obtain the boundary regions (i.e., mask regions of the boundaries of the object). Next, the recognized boundary regions are labeled, and that the boundary region labeling frames are determined. For instance, a rectangular frame may be circumscribed to the boundary regions to label the boundary regions. Finally, the labeled boundary region labeling frames are processed through the edge detection algorithm (e.g., Canny edge detection algorithm etc.) to obtain the line drawing of grayscale contours in the input image. In this embodiment, the edge detection algorithm only needs to perform edge detection on the labeled boundary region labeling frames, and does not need to perform edge detection on the entire input image. In this way, less computation is required, and increased processing speed is provided. Note that the boundary region labeling frames label a portion of the input image.

In some other embodiments, step S10 may further include the following steps. The input image is binarized to obtain a binarized image of the input image. Noise lines in the binarized image are filtered out, so that the line drawing of grayscale contours in the input image is obtained. For instance, corresponding filtering rules may be predetermined to filter out, for example, various line segments and various relatively small lines inside the object in the binary image, so that the line drawing of grayscale contours in the input image is obtained.

In the embodiments of the disclosure, in fact, the line drawing is a binarized drawing. The contour line segments are searched for in the binarized drawing, and these contour line segments are processed to obtain the final boundary lines of the object. That is, the input image is binarized in order to obtain contour lines in the input image. In the disclosure, the line drawing may be contour lines with various character shapes, and the line drawing does not necessarily include only line segments. Besides, the line drawing not only includes lines at the edges of the object, but may also include various line segments inside the object, various line segments outside the object, and so on.

After the input image 21 shown in FIG. 2A is processed through the edge detection algorithm, a line drawing of grayscale contours as shown in the image 22 shown in FIG. 2B may be obtained. After the input image 31 shown in FIG. 3A is processed through the edge detection algorithm, a line drawing of grayscale contours as shown in the image 32 shown in FIG. 3B may be obtained.

In the line drawing of grayscale contours, the lines are actually small line segments, and each boundary line of the object of the input image is actually divided into small line segments. Therefore, similar lines are required to be connected, so that subsequent processing may be performed to obtain the boundary lines of the object. In practical applications, representation of each small line segment in the line drawing is in the form of an array. In a coordinate system corresponding to the entire line drawing, each line segment is determined by coordinates of a pixel point corresponding to a start point and coordinates of a pixel point corresponding to an end point.

Next, as shown in FIG. 1, in step S11, the lines are merged to obtain a plurality of reference boundary lines.

For instance, the reference boundary lines may be divided into a plurality of reference boundary line groups corresponding to the boundary regions one-to-one (to be described in detail below), and each reference boundary line group among the reference boundary line groups includes at least one reference boundary line.

In some embodiments, step S11 may further include the following steps. Similar lines among the lines are merged to obtain a plurality of initial merged line groups. The initial merged line groups correspond to the boundary regions one-to-one, and each initial merged line group among the initial merged line groups includes at least one initial merged line. A plurality of boundary connecting lines are determined according to the initial merged line groups. The boundary connecting lines correspond to the boundary regions one-to-one, and the boundary connecting lines also correspond to the initial merged line groups one-to-one as well. The boundary regions are converted into a plurality of straight line groups. The straight line groups correspond to the boundary regions one-to-one, and each straight line group among the straight line groups includes at least one straight line. A plurality of average slopes corresponding to the straight line groups one-to-one are calculated. Slopes of the boundary connecting lines are calculated. For a $b1^{th}$ boundary connecting line among the boundary connecting lines, it is determined whether a difference between the slope of the $b1^{th}$ boundary connecting line and the average slope among the average slopes corresponding to the $b1^{th}$ boundary connecting line is greater than a second slope threshold, where b1 is a positive integer, and b1 is less than or equal to a number of the boundary connecting lines. In response to the difference between the slope of the $b1^{th}$ boundary connecting line and the average slope corresponding to the $b1^{th}$ boundary connecting line being less than or equal to the second slope threshold, the $b1^{th}$ boundary connecting line and the initial merged line in the initial merged line group corresponding to the $b1^{th}$ boundary connecting line are served as the reference boundary lines in the reference boundary line group corresponding to the boundary region corresponding to the $b1^{th}$ boundary connecting line. In response to the difference between the slope of the $b1^{th}$ boundary connecting line and the average slope corresponding to the $b1^{th}$ boundary connecting line being greater than the second slope threshold, the initial merged line in the initial merged line group corresponding to the $b1^{th}$ boundary connecting line is served as the reference boundary line in the reference boundary line group corresponding to the boundary region corresponding to the $b1^{th}$ boundary connecting line. The above operations are performed on the boundary connecting lines to determine the reference boundary lines.

In some embodiments, a range of the second slope threshold may be 0-20 degrees, e.g., 0-10 degrees. For instance, the second slope threshold may be 5 degrees, 15 degrees, and so on.

Note that in the embodiments of the disclosure, "the difference between the two slopes" means a difference between angles of inclination corresponding to the two slopes. For instance, the angle of inclination corresponding to the slope of the $b1^{th}$ boundary connecting line may represent an angle between the $b1^{th}$ boundary connecting line and a given direction (e.g., a horizontal direction or a vertical direction). The angle of inclination corresponding to the average slope may represent an angle between a straight line determined based on the average slope and the given direction. For instance, an angle of inclination (e.g., a first angle of inclination) of the $b1^{th}$ boundary connecting line and an angle of inclination (e.g., a second angle of inclination) corresponding to the average slope among the average slopes corresponding to the $b1^{th}$ boundary connecting line may be calculated. If a difference between the first angle of inclination and the second angle of inclination is greater than or equal to the second slope threshold, the $b1^{th}$ boundary connecting line does not act as the reference boundary line. If the difference between the first angle of inclination and the second angle of inclination is less than the second slope threshold, the $b1^{th}$ boundary connecting line may act as the reference boundary line.

Note that the straight line groups, average slopes, boundary regions, etc. are to be described in following paragraphs, and description thereof is not provided herein.

In step S11, the step of merging the similar lines among the lines to obtain the initial merged line groups further includes the following steps. A plurality of long lines among the lines are acquired. Each long line among the long lines is a line whose length exceeds a length threshold. A plurality of merged line groups are obtained according to the long lines. Each merged line group among the merged line groups includes at least two successively adjacent long lines, and an angle between any two adjacent long lines in each merged line group is less than an angle threshold. For each merged line group among the merged line groups, the long lines in the merged line group are sequentially merged to obtain an initial merged line corresponding to the merged line group, and the merged line groups are merged to determine the initial merged lines in the initial merged line groups.

Numbers of all initial merged lines included in the initial merged line groups and the merged line groups are identical, and all the initial merged lines included in the initial merged line groups correspond to the merged line groups one-to-one. Note that after the initial merged line corresponding to the merged line group is obtained based on the merged line group, based on a position of the initial merged line, the boundary region corresponding to the initial merged line may be determined, and that the initial merged line group to which the initial merged line belongs may be determined.

Note that in the embodiments of the disclosure, "similar lines" means that the angle between two lines is less than the angle threshold.

In this embodiment, the long line in the line drawing refers to the line whose length exceeds the length threshold among the multiple lines in the line drawing. For instance, a line whose length exceeds 2 pixels is defined as a long line, that is, the length threshold is 2 pixels, but the embodiments of the disclosure include but are not limited to the above. In some other embodiments, the length threshold may also be 3 pixels, 4 pixels, and so on. Only the long lines in the line drawing are obtained for the subsequent merging processing, and some shorter lines in the line drawing are not merged, and in this way, line interference inside and outside the object may be prevented from occurring when the lines are merged. For instance, lines corresponding to text and graphics inside the object and other objects outside the object may be removed.

In this embodiment, the merged line groups may be obtained through the following manner. First, a long line T1 is selected, and then starting from the long line T1, it is sequentially determined whether the angle between two adjacent long lines is less than the angle threshold. If it is determined that the angle between a long line T2 and a long line adjacent to the long line T2 is not less than the angle threshold, the long line T1, the long line T2, and all successively adjacent long lines between the long line T1 and the long line T2 may be combined into a combined line group. Next, the above process is repeated. That is, starting from the long line adjacent to the long line T2, it is determined whether the angle between two adjacent long lines is less than the angle threshold, the rest may be deduced by analogy until all the long lines are processed, and the merged line groups are thereby obtained. Note that "two adjacent long lines" means two long lines that are physically adjacent to each other, that is, there are no other long lines between the two adjacent long lines.

The initial merged lines are lines longer than the long lines.

Figure 4:
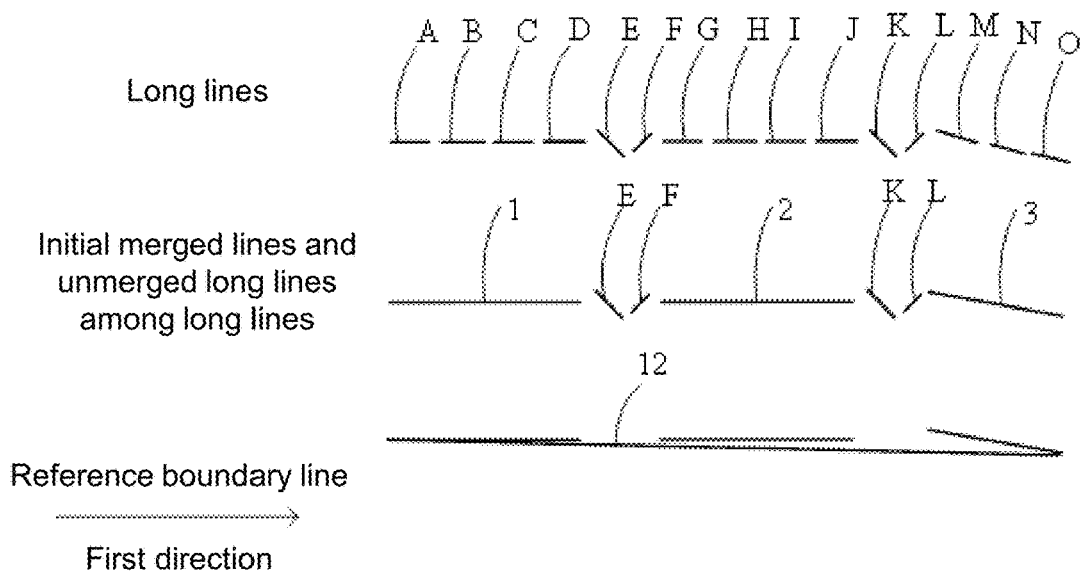
FIG. 4 is a schematic diagram of a line merging process according to an embodiment of the disclosure.

FIG. 4 is a schematic diagram of a line merging process according to an embodiment of the disclosure.

FIG. 4 is taken as an example hereinafter, and the above-mentioned process of obtaining the merged line groups is described. In an embodiment, for instance, a first long line A is selected first, and it is determined whether the angle between the long line A and a long line B adjacent to the long line A is less than the angle threshold. If the angle between the long line A and the long line B is less than the angle threshold, it means that the long line A and the long line B belong to the same merged line group. Whether the angle between the long line B and a long line C adjacent to the long line B is less than the angle threshold is then determined. If the angle between the long line B and the long line C is less than the angle threshold as well, it means that the long line C, the long line B, and the long line A all belong to the same merged line group. Next, the angle between the long line C and a long line D adjacent to the long line C continues to be determined. If the angle between the long line C and the long line D is less than the angle threshold as well, it means that the long line D, the long line C, the long line B, and the long line A all belong to the same merged line group. Next, the angle between the long line D and a long line E adjacent to the long line D continues to be determined. If the angle between the long line D and the long line E is greater than or equal to the angle threshold, it means that the long line E and the long lines A/B/C/D do not belong to the same merged line group. So far, the long line A, the long line B, the long line C, and the long line D may be served as one merged line group.

For instance, the merged line group formed by the long line A, the long line B, the long line C, and the long line D may be a first merged line group. Next, starting from the long line E, it is determined whether the angle between two adjacent long lines is less than the angle threshold, and in this way, it may be known that a long line G, a long line H, a long line I, and a long line J belong to one merged line group. For instance, the merged line group formed by the long line G, the long line H, the long line I, and the long line J may be a second merged line group, and a long line M, a long line N, and a long line O belong to one merged line group. For instance, the merged line group formed by the long line M, the long line N, and the long line O may be a third merged line group.

In another embodiment, first, one long line, e.g., the long line D, may be randomly selected from the long lines. The long lines adjacent to the long line D include the long line C and the long line E. It is determined whether the angle between the long line D and the long line C is less than the angle threshold, and it is determined whether the angle between the long line D and the long line E is less than the angle threshold. Since the angle between the long line D and the long line C is less than the angle threshold, the long line D and the long line C belong to the same merged line group. Since the angle between the long line D and the long line E is greater than the angle threshold, the long line D and the long line E belong to different merged line groups. Next, on the one hand, starting from the long line C, the angles between other adjacent long lines are then determined, so that other long lines belonging to the same merged line group as the long line D are determined. Besides, other merged line groups may also be determined. On the other hand, starting from the long line E, the angles between other successively adjacent long lines may be determined, so that other merged line groups may be determined. By analogy, in the end, it can be determined that the long line A, the long line B, the long line C, and the long line D belong to one merged line group, the long line G, the long line H, the long line I, and the long line J belong to one merged line group, and the long line M, the long line N, and the long line O belong to one merged line group as well.

For instance, the angle between two adjacent long lines is calculated through the following formula:

$$\vec{a} \cdot \vec{b} = |\vec{a}||\vec{b}|\cos\theta$$

where $\vec{a}$ and $\vec{b}$ represent the vectors of two adjacent long lines. For instance, a numerical value of the angle threshold may be set according to the actual situation. For instance, in some embodiments, a range of the angle threshold may be 0-20 degrees, e.g., 0-10 degrees. For instance, the angle threshold may be 5 degrees, 15 degrees, and so on.

For instance, the merging two long lines refers to averaging the slopes of two long lines to obtain an average value of the slopes, and this average value of the slopes is the slope of the merged line. In practical applications, the merging of two long lines is calculated based on the array form of the two long lines. For instance, two long lines are a first long line and a second long line. The merging of the two long lines means that the start point of the first long line (i.e., line segment head) and the end point of the second long line (i.e., line segment tail) are directly connected to form a new and longer line. That is, in the coordinate system corresponding to the line drawing, the start point of the first long line and the end point of the second long line are directly connected in a straight line to obtain the merged line. For instance, the coordinates of the pixel point corresponding to the start point of the first long line is served as the coordinates of the pixel point corresponding to the start point of the merged line, and the coordinates of the pixel point corresponding to the end point of the second long line is served as the coordinates of the pixel point corresponding to the end point of the merged line. Finally, the coordinates of the pixel point corresponding to the start point of the merged line and the coordinates of the pixel point corresponding to the end point of the merged line are formed into an array of the merged line, and the array is stored. The long lines in each merged line group are sequentially merged to obtain the corresponding initial merged line.

As shown in FIG. 4, the long line A, the long line B, the long line C, and the long line D in the first merged line group are sequentially merged to obtain the initial merged line corresponding to the merged line group. For instance, first, the long line A and the long line B may be merged to obtain a first merged line, and the first merged line and the long line C may then be merged to obtain a second merged line. Next, the second merged line is merged with the long line D, and an initial merged line 1 corresponding to the first merged line group is thereby obtained. Similarly, the long lines in the second merged line group are merged to obtain an initial merged line 2 corresponding to the second merged line group, and the long lines in the third merged line group are merged to obtain an initial merged line 3 corresponding to the third merged line group. After the long lines in the merged line groups are merged, there are still the long line E, the long line F, the long line K, and the long line L that are not merged.

In step S11, the step of determining the boundary connecting lines according to the initial merged line groups further includes the following steps. For a $b2^{th}$ initial merged line group among the initial merged line groups, the initial merged lines in the $b2^{th}$ initial merged line group are sorted according to an arrangement direction of the initial merged lines in the $b2^{th}$ initial merged line group to determine a first initial merged line and a last initial merged line in the $b2^{th}$ initial merged line group. A start point of the first initial merged line and an end point of the last initial merged line are connected to obtain the boundary connecting line corresponding to the $b2^{th}$ initial merged line group. The above operations are performed on the initial merged line groups to determine the boundary connecting lines.

For instance, b2 is a positive integer, and b2 is less than or equal to the number of the initial merged line groups.

As shown in FIG. 4, a specific initial merged line group includes the initial merged lines 1, 2, and 3, and the initial merged lines 1, 2, and 3 are arranged substantially in a first direction. The initial merged lines 1, 2, and 3 are sorted in the first direction, it thus can be seen that the first initial merged line in the initial merged line group is the initial merged line 1, and the last initial merged line is the initial merged line 3. Next, the start point of the initial merged line 1 and the end point of the initial merged line 3 are connected to obtain a boundary connecting line 12 corresponding to the initial merged line group. For instance, if the difference between the slope of the boundary connecting line 12 and the average slope corresponding to the boundary connecting line 12 is less than or equal to the second slope threshold, the boundary connecting line 12 and the initial merged lines (i.e., the initial merged lines 1, 2, and 3) in the initial merged line group corresponding to the boundary connecting line 12 are served as the reference boundary lines in the reference boundary line group corresponding to the boundary region corresponding to the boundary connecting line 12. Herein, the reference boundary lines in the reference boundary line group include the boundary connecting line 12 and initial merged lines 1, 2, and 3. If the difference between the slope of the boundary connecting line 12 and the average slope corresponding to the boundary connecting line 12 is greater than the second slope threshold, the initial merged lines (i.e., the initial merged lines 1, 2, and 3) in the initial merged line group corresponding to the boundary connecting line 12 are served as the reference boundary lines in the reference boundary line group corresponding to the boundary region corresponding to the boundary connecting line 12. Herein, the reference boundary lines in the reference boundary line group include the initial merged lines 1, 2, and 3.

Note that if an initial merged line group includes only one initial merged line, the first initial merged line in the initial merged line group is the same as the last initial merged line. That is, the initial merged line acts as the first initial merged line in the initial merged line group and as the last initial merged line in the initial merged line group.

The first direction may be a horizontal direction or a vertical direction.

The reference boundary lines may also be stored in the form of an array.

Among the initial merged lines, there are not only the reference boundary lines, but also some long interference lines. For instance, the interference lines include text and graphics inside the object as well as longer lines obtained by merging the lines corresponding to other objects outside the object. These interference lines may be removed according to subsequent processing and rules.

As shown in FIG. 1, in step S12, the input image is processed through the first boundary region recognition model to obtain the boundary regions corresponding to the object with edges.

In this embodiment, the first boundary region recognition model may be implemented through the machine learning technology and may run on, for example, a general-purpose computing apparatus or a dedicated computing apparatus. The first boundary region recognition model is a neural network model obtained through pre-training. For instance, the first boundary region recognition model may be implemented by using a neural network such as a deep convolutional neural network (DEEP-CNN). The first boundary region recognition model and the second boundary region recognition model may be the same model.

First, the first boundary region recognition model is established through machine learning training. The first boundary region recognition model may be trained and obtained through the following process. Labeling processing is performed on each image sample in an image sample set to label a boundary line region, an internal region, and an external region of the object in each image sample. A neural network is trained through the labeled image sample set to obtain the first boundary region recognition model.

For instance, the first boundary region recognition model established by machine learning training recognizes the input image and may recognize 3 parts of the input image namely the boundary line region, the internal region (the region where the object is located), and the external region (the external region of the object), so as to obtain each boundary region of the input image. Herein, an edge contour in the boundary region is thick. For instance, in some embodiments, the shape of the object may be a rectangle, and a number of the boundary regions may be 4. That is, the input image is recognized by the first boundary region recognition model, so that four boundary regions corresponding to the four sides of the rectangle may be obtained.

In some embodiments, the boundary regions include a first boundary region, a second boundary region, a third boundary region, and a fourth boundary region. In some embodiments, as shown in FIG. 2A, the first boundary region may represent the region corresponding to a boundary line a1, the second boundary region may represent the region corresponding to a boundary line a2, the third boundary region may represent the region corresponding to a boundary line a3, and the fourth boundary region may represent the region corresponding to a boundary line a4. In some other embodiments, as shown in FIG. 3A, the first boundary region may represent the region corresponding to a boundary line b1, the second boundary region may represent the region corresponding to a boundary line b2, the third boundary region may represent the region corresponding to a boundary line b3, and the fourth boundary region may represent the region corresponding to a boundary line b4.

It can be understood that, first, the boundary regions of the object in the input image are recognized through the first boundary region recognition model. Next, based on the boundary regions, the target boundary lines are determined among the reference boundary lines, and in this way, misrecognized interference lines, such as lines falling into the middle of the business card or document and lines in the middle of the table, may be removed.

As shown in FIG. 1, in step S13, for each reference boundary line among the reference boundary lines, the reference boundary line is compared with the boundary regions, and the number of pixel points on the reference boundary line belonging to the boundary regions is counted and served as the score of the reference boundary line. The above processing is performed on multiple reference boundary lines to determine the scores corresponding to the reference boundary lines one-to-one.

In step S13, the step of comparing the reference boundary line with the boundary regions and counting and serving the number of pixel points on the reference boundary line belonging to the boundary regions as the score of the reference boundary line further includes the following steps. A boundary region matrix is determined according to the boundary regions. The reference boundary line is extended to obtain an extended reference boundary line. A line matrix is determined according to the extended reference boundary line. The line matrix is compared with the boundary region matrix, and a number of pixel points on the extended reference boundary line belonging to the boundary region matrix is counted to serve as the score of the reference boundary line.

The boundary region matrix is determined through the following manner. Position information of the pixels in the boundary regions is mapped to an entire boundary image matrix. The values of the positions of the pixel points of the boundary regions in the boundary image matrix are set to a first value, the values of the positions of the pixel points other than the boundary regions are set to a second value, and the boundary region matrix is thereby formed. Note that the first value and the second value represent grayscale values.

A size of the boundary region matrix may be the same as a size of the image matrix corresponding to the input image.

For instance, if the size of the input image is 1024×1024 pixels, the image matrix corresponding to the input image is a 1024×1024 matrix, and the boundary region matrix is also a 1024×1024 matrix. For instance, a first pre-filled matrix may be set according to the size of the image matrix, the first pre-filled matrix may be filled with values according to the positions in the first pre-filled matrix corresponding to the boundary regions, and the values of the pixel points corresponding to the positions in the first pre-filled matrix of the boundary regions are set to the first value, for example, the first value is 255. In the first pre-filled matrix, the values of pixel points at positions other than the positions corresponding to the boundary regions are set to the second value, for example, the second value is 0, and the boundary region matrix is thereby formed.

The following exemplarily provides a boundary region matrix, and the boundary region matrix is a 10×10 matrix. In the boundary region matrix, the boundary regions are formed when the positions of pixel points with a value of 255 are connected. For instance, all pixel points with a value of 255 located in the first row and the second row form one boundary region.

$$\begin{bmatrix} 0 & 0 & 255 & 255 & 0 & 255 & 0 & 255 & 0 & 255 \\ 0 & 255 & 255 & 255 & 255 & 255 & 255 & 255 & 255 & 0 \\ 255 & 255 & 0 & 0 & 0 & 0 & 0 & 255 & 255 & 0 \\ 0 & 0 & 255 & 0 & 0 & 0 & 0 & 0 & 255 & 0 \\ 255 & 255 & 0 & 0 & 0 & 0 & 0 & 0 & 255 & 0 \\ 0 & 255 & 0 & 0 & 0 & 0 & 0 & 0 & 255 & 0 \\ 0 & 255 & 0 & 0 & 0 & 0 & 255 & 255 & 0 \\ 0 & 255 & & 0 & 0 & 0 & 0 & 0 & 255 & 0 \\ 0 & 255 & 255 & 255 & 255 & 255 & 255 & 255 & 255 & 0 \\ 0 & 0 & 255 & 255 & 255 & 255 & 0 & 0 & 0 & 0 \end{bmatrix}$$

Note that in the embodiments of the disclosure, one boundary region matrix may be obtained based on multiple boundary regions, and multiple boundary region matrices corresponding to multiple boundary regions one-to-one may also be obtained based on the multiple boundary regions.

Sizes of the line matrix and the boundary region matrix are identical.

Note that when the score of the reference boundary line is calculated, the number of pixel points on the reference boundary line belonging to the boundary regions corresponding to the reference boundary line may be counted to act as the score of the reference boundary line. Besides, when the boundary regions are processed to obtain the boundary region matrices corresponding to the boundary regions one-to-one, for a specific reference boundary line, the reference boundary line may be compared with the boundary region matrix corresponding to the boundary region corresponding to the reference boundary line to obtain the score of the reference boundary line.

Note that when the score of the reference boundary line is calculated, the boundary region matrix may not have to be set, but the reference boundary line is directly compared with the corresponding boundary region to determine the number of pixel points on the reference boundary line belonging to the corresponding boundary region. The number of the pixel points is the score of the reference boundary line.

The step of determining the line matrix according to the extended reference boundary line further includes the following steps. Position information of the pixel points in the extended reference boundary line is mapped to an image matrix. Values corresponding to the pixel points in extended reference boundary line in the image matrix are set to the first value and values corresponding to pixel points other than the pixel points in extended reference boundary line in the image matrix are set to the second value to form the line matrix.

When determining the score of each reference boundary line, first, for each reference boundary line, the reference boundary line is extended. The line matrix corresponding to the reference boundary line is determined according to the extended reference boundary line. Next, the line matrix is compared with the boundary region matrix, that is, it is determined how many pixel points on the extended reference boundary line belong to the boundary region matrix. The number of pixel points on the extended reference boundary line belonging to the boundary region matrix is counted to serve as the score of the reference boundary line.

The line matrix may be determined as follows. A second pre-filled matrix may be set according to the size of the image matrix. The extended reference boundary line is redrawn, and the position information of the pixel points in the redrawn line is mapped to the second pre-filled matrix. The values of the pixel points at the position where the redrawn line is located in the second pre-filled matrix is set to the first value, the values of the pixel points at the position other than the position of the redrawn line is set to the second value, and the line matrix corresponding to the reference boundary line is thereby formed. The formation of the line matrix is similar to the formation of the boundary region matrix, and description thereof is not repeated herein. Note that the image matrix represents the pixel matrix corresponding to the input image.

It should be noted that the reference boundary line is stored in the form of an array, that is, the coordinates of the start point and the end point of the reference boundary line are stored.

After the reference boundary line is extended, when storing the extended reference boundary line, the coordinates of the start point and the end point of the extended reference boundary line are stored to form an array. Therefore, before the reference boundary line is compared with the boundary region matrix, each extended reference boundary line needs to be formed as actual line data. Each extended reference boundary line may be redrawn, for example, with a line width of 2 pixels, so that the coordinates of the pixel point corresponding to each extended reference boundary line are obtained. The second pre-filled matrix is then filled with values according to the coordinates of the pixel points corresponding to each extended reference boundary line, and the line matrix is thereby obtained. For instance, the values of the pixel points at the position corresponding to the extended reference boundary line in the second pre-filled matrix is set to 255, and the values of the pixel points at the remaining positions other than the position corresponding to the extended reference boundary line is set to 0.

The line matrix is compared with the boundary region matrix to determine a number of pixel points in the reference boundary line that fall into the boundary region matrix. That is, it is determined how many pixel points in the same position in the line matrix and the boundary region matrix have the same first value (e.g., 255), so as to calculate the score of the reference boundary line. That is, if the value of the pixel point in the $j1^{th}$ row and $j2^{th}$ column of the line matrix and the value of the pixel point in the $j1^{th}$ row and $j2^{th}$ column in the boundary region matrix are both 255, it means that the pixel points on the reference boundary line located in the j1$^{th}$ row and the j2$^{th}$ column fall into the boundary region matrix. j1 and j2 are both positive integers.

In this embodiment, a line matrix formed by an extended reference boundary line is shown as follows. By comparing the line matrix with the boundary region matrix, it can be seen that 7 pixel points on the extended reference boundary line fall into the boundary region matrix, and the score of the reference boundary line is thereby 7.

$$\begin{bmatrix} 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \\ 0 & 255 & 0 & 0 & 0 & 0 & 0 & 0 & 0 & 0 \end{bmatrix}$$

As shown in FIG. 1, in step S14, the target boundary lines are determined according to the reference boundary lines, the scores, and the boundary regions. After the score of each reference boundary line is determined, the target boundary lines are determined from the reference boundary lines according to the scores of the reference boundary lines.

In step S14, the step of determining the target boundary lines according to the reference boundary lines, the scores, and the boundary regions further includes the following steps. The boundary regions are converted into a plurality of straight line groups. A plurality of average slopes corresponding to the straight line groups one-to-one are calculated. Slopes of the reference boundary lines are calculated. For an i$^{th}$ reference boundary line among the reference boundary lines, it is determined whether a difference between the slope of the i$^{th}$ reference boundary line and the average slope among the average slopes corresponding to the i$^{th}$ reference boundary line is greater than a first slope threshold, where i is a positive integer, and i is less than or equal to a number of the reference boundary lines. In response to the difference between the slope of the i$^{th}$ reference boundary line and the average slope corresponding to the i$^{th}$ reference boundary line being lower than or equal to the first slope threshold, the i$^{th}$ reference boundary line is determined as a target reference boundary line. The above operations are performed on multiple reference boundary lines, so as to determine the target reference boundary lines among the reference boundary lines. A plurality of intermediate target boundary lines are determined according to the scores of the reference boundary lines corresponding to the target reference boundary lines. The target boundary lines are determined according to intermediate target boundary lines.

In some embodiments, a range of the first slope threshold may be 0-20 degrees, e.g., 0-10 degrees. For instance, the first slope threshold may be 5 degrees, 15 degrees, and so on. For instance, the first slope threshold and the second slope threshold may be the same or different, which is not limited in the embodiments of the disclosure.

Each reference boundary line corresponds to only one average slope. As shown in FIG. 2, if the first boundary region represents the region corresponding to the boundary line a1 and a specific reference boundary line represents the reference boundary line corresponding to the boundary line a1, the average slope corresponding to the specific reference boundary line is the average slope determined according to the straight line group corresponding to the first boundary region.

The straight line groups correspond to the boundary regions one-to-one, and each straight line group among the straight line groups includes at least one straight line.

In some embodiments, the step of converting the boundary regions into the straight line groups further includes the following step. Hough transform is applied to convert the boundary regions into the straight line groups. It should be noted that other manners may also be applied to convert the boundary regions into the straight line groups, which is not limited in this embodiment.

The intermediate target boundary lines include a first intermediate target boundary line group corresponding to the first boundary region, a second intermediate target boundary line group corresponding to the second boundary region, a third intermediate target boundary line group corresponding to the third boundary region, and a fourth intermediate target boundary line group corresponding to the fourth boundary region.

In some embodiments, 4 target boundary lines are provided, including the target boundary line corresponding to the first boundary region, the target boundary line corresponding to the second boundary region, the target boundary line corresponding to the third boundary region, and the target boundary line corresponding to the fourth boundary region.

According to the slope of the reference boundary line and the determined average slope of the boundary regions which is determined based on machine learning, the intermediate target boundary lines whose slope difference is greater than the first slope threshold may be determined. Next, the scores of the intermediate target boundary lines are sorted. The intermediate target boundary line in the first intermediate target boundary line group with the highest score is served as the target boundary line corresponding to the first boundary region. The intermediate target boundary line in the second intermediate target boundary line group with the highest score is served as the target boundary line corresponding to the second boundary region. The intermediate target boundary line in the third intermediate target boundary line group with the highest score is served as the target boundary line corresponding to the third boundary region. The intermediate target boundary line in the fourth intermediate target boundary line group with the highest score is served as the target boundary line corresponding to the fourth boundary region.

The reference boundary lines include a first reference boundary line group corresponding to the first boundary region, a second reference boundary line group corresponding to the second boundary region, a third reference boundary line group corresponding to the third boundary region, and a fourth reference boundary line group corresponding to the fourth boundary region.

The edge detection method provided by the embodiments of the disclosure further includes the following steps. The method responds to difference between the slopes of all reference boundary lines in a selected reference boundary line group of the reference boundary lines and the average slope corresponding to the selected reference boundary line group being all greater than the first slope threshold. A selected boundary region corresponding to the selected reference boundary line group is obtained. According to the straight line group corresponding to the selected boundary region, a median of the straight line group corresponding to the selected boundary region is determined, and the median is determined to act as the target boundary line corresponding to the selected boundary region.

Taking the first boundary region as an example, if the intermediate target boundary lines do not include the intermediate target boundary line corresponding to the first boundary region, the target boundary line corresponding to the first boundary region may be determined based on the straight line group corresponding to the first boundary region. Provided that there is no contradiction, the above description of the first boundary region is also applicable to the second boundary region, the third boundary region, and the fourth boundary region.

The selected reference boundary line group is any one of the first reference boundary line group, the second reference boundary line group, the third reference boundary line group, and the fourth reference boundary line group. Similarly, the selected boundary region is any one of the first boundary region, the second boundary region the third boundary region, and the fourth boundary region. For instance, in the case that the selected reference boundary line group is the first reference boundary line group, the selected boundary region is the first boundary region. In the case that the selected reference boundary line group is the second reference boundary line group, the selected boundary region is the second boundary region. In the case that the selected reference boundary line group is the third reference boundary line group, the selected boundary region is the third boundary region. In the case that the selected reference boundary line group is the fourth reference boundary line group, the selected boundary region is the fourth boundary region.

In some embodiments, the step of determining the median of the straight line group corresponding to the selected boundary region according to the straight line group corresponding to the selected boundary region further includes the following steps. Coordinates of a plurality of start points of a plurality of straight lines in a straight line group are averaged to determine the coordinates of the start point of the median. Coordinates of a plurality of end points of the straight lines in the straight line group are averaged to determine the coordinates of the end point of the median, and the median of the straight line group is thereby determined.

In some other embodiments, the step of determining the median of the straight line group corresponding to the selected boundary region according to the straight line group corresponding to the selected boundary region further includes the following steps. Among a plurality of straight lines in a straight line group, L straight lines (e.g., 10 straight lines) whose length is greater than a specific threshold are selected. The coordinates of the L start point of the L straight lines are averaged to determine the coordinates of the start point of the median. The coordinates of the L end points of the L straight lines are averaged to determine the coordinates of the end point of the median, and the median of the L straight lines is thereby determined.

In step S14, the step of determining the intermediate target boundary lines according to the scores of the reference boundary lines corresponding to the target reference boundary lines further includes the following steps. The target reference boundary line among the target reference boundary lines whose score is greater than a score threshold is served as the intermediate target boundary line. For instance, the score threshold may be pre-determined by the user according to the actual situation.

In step S14, the step of determining the target boundary lines according to intermediate target boundary lines further includes the following steps. For a $k^{th}$ intermediate target boundary line among the intermediate target boundary lines, coincidence degree judgment is performed on the $k^{th}$ intermediate target boundary line to determine whether the $k^{th}$ intermediate target boundary line is a target boundary line. The coincidence degree judgment is performed on the intermediate target boundary line to determine the target boundary line, and in this way, the accuracy of the obtained target boundary line may be improved, and that accurate edges may be determined for the object.

The step of performing the coincidence degree judgment on the $k^{th}$ intermediate target boundary line further includes the following steps. A ratio of pixel points of the $k^{th}$ intermediate target boundary line falling into the boundary region corresponding to the $k^{th}$ intermediate target boundary line to all pixel points of the $k^{th}$ intermediate target boundary line is calculated, where k is a positive integer, and k is less than or equal to a number of the intermediate target boundary lines. It is determined whether the ratio is greater than or equal to a ratio threshold. In response to the ratio being greater than or equal to the ratio threshold, the $k^{th}$ intermediate target boundary line is determined to be the target boundary line, and coincidence degree judgment is performed on the intermediate target boundary lines to determine the target boundary lines. In response to the ratio being less than the ratio threshold, the $k^{th}$ intermediate target boundary line is deleted, and the coincidence degree judgment is continuously performed on any intermediate target boundary line (e.g., $k+1^{th}$ intermediate target boundary line) among the intermediate target boundary lines except the $k^{th}$ intermediate target boundary line.

In some embodiments, the ratio threshold may be 80%. The ratio of the pixel points of each intermediate target boundary line falling into the boundary region corresponding to the intermediate target boundary line to all pixel points of the intermediate target boundary line is calculated. If the ratio is less than 80%, it means that the coincidence degree of the intermediate target boundary line is not good, and the intermediate target boundary line is discarded. When the ratios corresponding to all intermediate target boundary lines are less than the ratio threshold, the line segment between the intersection points of the input image and an extension line of the adjacent determined target boundary line is directly selected as the target boundary line. For instance, as shown in FIG. 2A, in the case that the target boundary line corresponding to the third boundary region (corresponding to the boundary line a3) cannot be determined, two first intersection points of the input image 21 and the extension line of the target boundary line corresponding to the second boundary region can be determined, and two second intersection points of the input image 21 and the extension line of the target boundary line corresponding to the fourth boundary region can be determined. For instance, the line segment between the first intersection point between the two first intersection points on the lower side of the input image and the second intersection point between the two intersection points on the lower side of the input image is served as the target boundary line corresponding to the third boundary region.

Finally, as shown in FIG. 1, in step S15, the edges of the object with edges in the input image are determined according to the determined target boundary lines.

After the target boundary lines are determined, since each target boundary line corresponds to one boundary region of the object in the input image, the target boundary lines constitute the edges of the object. As shown in the input image 21 shown in FIG. 2A, the edges of the object in the input image 21 are composed of the four longer lines in the image 22 shown in FIG. 2B, namely the target boundary lines a1, a2, a3, and a4. As shown in the input image 31 shown in FIG. 3A, the edges of the object in the input image 31 are composed of the four longer lines in the image 32 shown in FIG. 3B, namely the target boundary lines b1, b2, b3, and b4.

In some embodiments, the edge detection method further includes the following steps. A plurality of intersection points of the target boundary lines are obtained, and perspective transformation is performed on regions determined by the intersection points and the target boundary lines to obtain a front view of the object in the input image.

Every two adjacent target boundary lines intersect to obtain an intersection point, and each intersection point and each target boundary line define the region where the object in the input image is located together. Perspective transformation is to project a picture to a new viewing plane (Viewing Plane) and is also known as projection mapping. Because the real shape of the object in the input image obtained by photo taking is changed in the input image, that is, geometric distortion occurs. As shown in the input image 21 shown in FIG. 2A, the shape of the test sheet is originally rectangular, but the shape of the test sheet in the input image 21 is changed, and the shape of the test sheet became a parallelogram. Therefore, by performing perspective transformation on the region where the object is located in the input image, the region where the object is located in the input image may be transformed from a parallelogram to a rectangle. That is, the region where the object is located in the input image is corrected to remove the influence of geometric distortion, and the front view of the object in the input image is obtained. In the perspective transformation, the pixels are processed to obtain the front view according to the space projection conversion coordinates, and description thereof is not provided herein. As shown in the input image 21 shown in FIG. 2A, the finally-obtained front view of the object (i.e., the test sheet) in the input image 23 is shown in FIG. 2C. As shown in the input image 31 shown in FIG. 3A, the finally-obtained front view of the object (i.e., the business card) in the input image 33 is shown in FIG. 3C.

Figure 5:
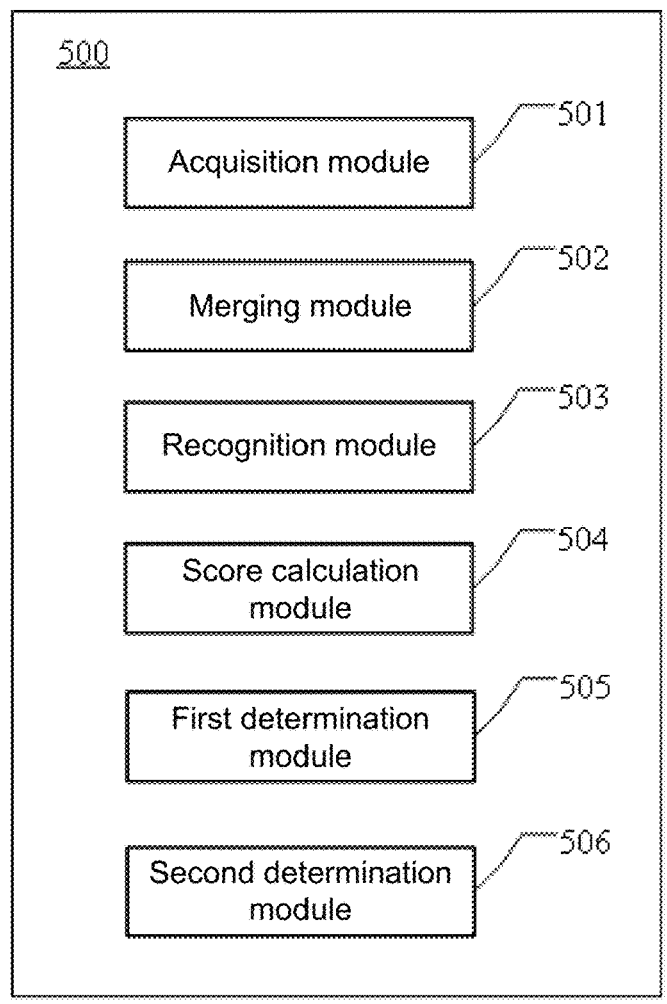
FIG. 5 is schematic block diagram of an edge detection device according to at least one embodiment of the disclosure.

At least one embodiment of the disclosure further provides an edge detection device. FIG. 5 is schematic block diagram of an edge detection device according to at least one embodiment of the disclosure.

As shown in FIG. 5, an edge detection device 500 may include an acquisition module 501, a merging module 502, a recognition module 503, a score calculation module 504, a first determination module 505, and a second determination module 506.

In this embodiment, the acquisition module 501 is configured for processing an input image to obtain a line drawing of grayscale contours in the input image. The input image includes an object with edges, and the line drawing includes a plurality of lines.

The merging module 502 is configured for merging the lines to obtain a plurality of reference boundary lines.

The recognition module 503 is configured for processing the input image through a first boundary region recognition model to obtain a plurality of boundary regions corresponding to the object with edges.

For each reference boundary line among the reference boundary lines, the score calculation module 504 is configured for comparing the reference boundary line with the boundary regions and counting and serving a number of pixel points on the reference boundary line belonging to the boundary regions as a score of the reference boundary line to determine a plurality of scores corresponding to the reference boundary lines one-to-one.

The first determination module 505 is configured for determining a plurality of target boundary lines according to the reference boundary lines, the scores, and the boundary regions.

The second determination module 506 is configured for determining edges of the object with edges according to the determined target boundary lines.

In some embodiments, the score calculation module 504 compares the reference boundary line with the boundary regions and counts the number of pixel points on the reference boundary line belonging to the boundary regions. In the operation of serving the number of pixel points as the score of the reference boundary line, the score calculation module 504 is configured to perform the following operations. A boundary region matrix is determined according to the boundary regions. The reference boundary line is extended to obtain an extended reference boundary line. A line matrix is determined according to the extended reference boundary line. The line matrix is compared with the boundary region matrix, and a number of pixel points on the extended reference boundary line belonging to the boundary region matrix is counted to serve as the score of the reference boundary line. For instance, sizes of the line matrix and the boundary region matrix are identical.

In some embodiments, when the first determination module 505 determines the target boundary lines according to the reference boundary lines, the scores of the reference boundary lines, and the boundary regions, the first determination module 505 is further configured to perform the following operations. The boundary regions are converted into a plurality of straight line groups. The straight line groups correspond to the boundary regions one-to-one, and each straight line group among the straight line groups includes at least one straight line. A plurality of average slopes corresponding to the straight line groups one-to-one are calculated. Slopes of the reference boundary lines are calculated. For an $i^{th}$ reference boundary line among the reference boundary lines, it is determined whether a difference between the slope of the $i^{th}$ reference boundary line and the average slope among the average slopes corresponding to the $i^{th}$ reference boundary line is greater than a first slope threshold, where i is a positive integer, and i is less than or equal to a number of the reference boundary lines. In response to the difference between the slope of the $i^{th}$ reference boundary line and the average slope corresponding to the $i^{th}$ reference boundary line being lower than or equal to the first slope threshold, the $i^{th}$ reference boundary line is determined to be a target reference boundary line to determine a plurality of target reference boundary lines among the reference boundary lines. A plurality of intermediate target boundary lines are determined according to the scores of the reference boundary lines corresponding to the target reference boundary lines. The target boundary lines are determined according to intermediate target boundary lines.

In some embodiments, the boundary regions include a first boundary region, a second boundary region, a third boundary region, and a fourth boundary region. The reference boundary lines include a first reference boundary line group corresponding to the first boundary region, a second reference boundary line group corresponding to the second boundary region, a third reference boundary line group corresponding to the third boundary region, and a fourth reference boundary line group corresponding to the fourth boundary region.

The first determination module 505 is further configured for corresponding to differences between the slopes of all reference boundary lines in a selected reference boundary line group of the reference boundary lines and the average slope corresponding to the selected reference boundary line group being all greater than the first slope threshold. The selected reference boundary line group is the first reference boundary line group, the second reference boundary line group, the third reference boundary line group, or the fourth reference boundary line group. A selected boundary region corresponding to the selected reference boundary line group is obtained. The selected boundary region is the first boundary region, the second boundary region, the third boundary region, or the fourth boundary region. According to the straight line group corresponding to the selected boundary region, a median of the straight line group corresponding to the selected boundary region is determined, and the median is determined to act as the target boundary line corresponding to the selected boundary region.

In some embodiments, when the first determination module 505 determines the target boundary lines according to the intermediate target boundary lines, the first determination module is further configured to perform the following operation. For a $k^{th}$ intermediate target boundary line among the intermediate target boundary lines, coincidence degree judgment is performed on the $k^{th}$ intermediate target boundary line to determine whether the $k^{th}$ intermediate target boundary line is a target boundary line.

The step of performing the coincidence degree judgment on the $k^{th}$ intermediate target boundary line further includes the following steps. A ratio of pixel points of the $k^{th}$ intermediate target boundary line falling into the boundary region corresponding to the $k^{th}$ intermediate target boundary line to all pixel points of the $k^{th}$ intermediate target boundary line is calculated, where k is a positive integer, and k is less than or equal to a number of the intermediate target boundary lines. It is determined whether the ratio is greater than or equal to a ratio threshold. In response to the ratio being greater than or equal to the ratio threshold, the $k^{th}$ intermediate target boundary line is determined to be the target boundary line to determine the target boundary lines. In response to the ratio being less than the ratio threshold, the $k^{th}$ intermediate target boundary line is deleted, and the coincidence degree judgment is continuously performed on any intermediate target boundary line among the intermediate target boundary lines except the $k^{th}$ intermediate target boundary line.

In some embodiments, the acquisition module 501 processes the input image to obtain the line drawing of grayscale contours in the input image, and the acquisition module 501 is further configured to perform the following operations. The input image is processed through a second boundary region recognition model to obtain the boundary regions. The boundary regions are processed to obtain a plurality of boundary region labeling frames. The boundary region labeling frames are processed through the edge detection algorithm to obtain the line drawing of grayscale contours in the input image.

In some embodiments, the reference boundary lines are divided into a plurality of reference boundary line groups corresponding to the boundary regions one-to-one, and each reference boundary line group among the reference boundary line groups includes at least one reference boundary line. When the merging module 502 merges the lines to obtain the reference boundary lines, the merging module 502 is further configured to perform the following operations. Similar lines among the lines are merged to obtain a plurality of initial merged line groups. The initial merged line groups correspond to the boundary regions one-to-one, and each initial merged line group among the initial merged line groups includes at least one initial merged line. A plurality of boundary connecting lines are determined according to the initial merged line groups. The boundary connecting lines correspond to the boundary regions one-to-one, and the boundary connecting lines also correspond to the initial merged line groups one-to-one as well. The boundary regions are converted into a plurality of straight line groups. The straight line groups correspond to the boundary regions one-to-one, and each straight line group among the straight line groups includes at least one straight line. A plurality of average slopes corresponding to the straight line groups one-to-one are calculated. Slopes of the boundary connecting lines are calculated. For a $b1^{th}$ boundary connecting line among the boundary connecting lines, it is determined whether a difference between the slope of the $b1^{th}$ boundary connecting line and the average slope among the average slopes corresponding to the $b1^{th}$ boundary connecting line is greater than a second slope threshold, where b1 is a positive integer, and b1 is less than or equal to a number of the boundary connecting lines. In response to the difference between the slope of the $b1^{th}$ boundary connecting line and the average slope corresponding to the $b1^{th}$ boundary connecting line being less than or equal to the second slope threshold, the $b1^{th}$ boundary connecting line and the initial merged line in the initial merged line group corresponding to the $b1^{th}$ boundary connecting line are served as the reference boundary lines in the reference boundary line group corresponding to the boundary region corresponding to the $b1^{th}$ boundary connecting line. In response to the difference between the slope of the $b1^{th}$ boundary connecting line and the average slope corresponding to the $b1^{th}$ boundary connecting line being less than the second slope threshold, the initial merged line in the initial merged line group corresponding to the $b1^{th}$ boundary connecting line is served as the reference boundary line in the reference boundary line group corresponding to the boundary region corresponding to the $b1^{th}$ boundary connecting line to determine the reference boundary lines.

In this embodiment, the acquisition module 501, the merging module 502, the recognition module 503, the score calculation module 504, the first determination module 505, and/or the second determination module 506 include codes and programs stored in a memory. A processor may execute the codes and the programs to implement some functions or all functions provided by each of the abovementioned acquisition module 501, the merging module 502, the recognition module 503, the score calculation module 504, the first determination module 505, and/or the second determination module 506. For instance, the acquisition module 501, the merging module 502, the recognition module 503, the score calculation module 504, the first determination module 505, and/or the second determination module 506 may be dedicated hardware devices configured to implement some functions or all functions of the abovementioned acquisition module 501, the merging module 502, the recognition module 503, the score calculation module 504, the first determination module 505, and/or the second determination module 506. For instance, each of the acquisition module 501, the merging module 502, the recognition module 503, the score calculation module 504, the first determination module 505, and/or the second determination module 506 may be a circuit board or a combination of multiple circuit boards configured to implement the functions described above. In the embodiments of the disclosure, the one circuit board or the combination of multiple circuit boards may include (1) one or a plurality of processors, (2) one or a plurality of non-transitory memories connected to the processor, and (3) firmware stored in the memory executable by the processor.

Note that the acquisition module 501 is configured for implementing step S10 shown in FIG. 1, the merging module 502 is configured for implementing step S11 shown in FIG. 1, the recognition module 503 is configured for implementing step S12 shown in FIG. 1, the score calculation module 504 is configured for implementing step S13 shown in FIG. 1, the first determination module 505 is configured for implementing step S14 shown in FIG. 1, and the second determination module 506 is configured for implementing step S15 shown in FIG. 1. Specific description of the functions provided by the acquisition module 501, the merging module 502, the recognition module 503, the score calculation module 504, the first determination module 505, and the second determination module 506 may be found with reference to the description related to steps S10 to S15 in the embodiments of the edge detection method shown in FIG. 1 and thus is not repeated herein. In addition, the edge detection device may achieve technical effects similar to that provided by the edge detection method, and description thereof is not repeated herein.

Figure 6:
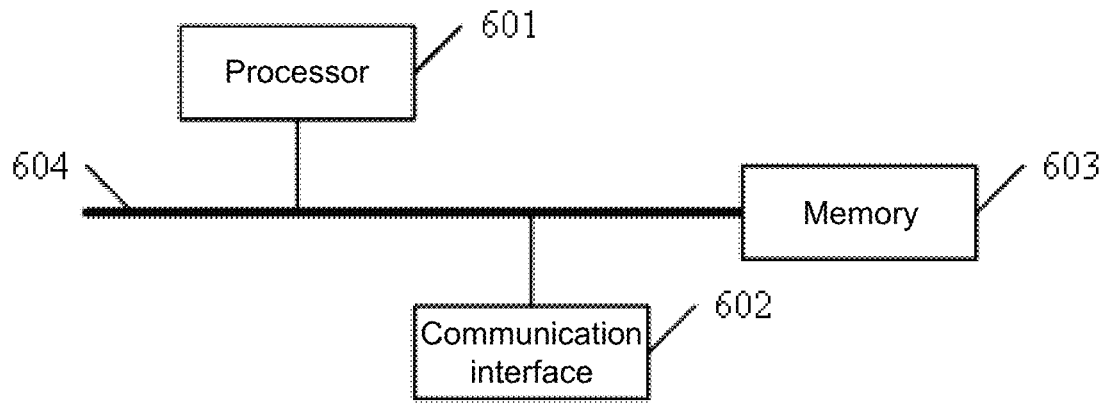
FIG. 6 is a schematic block diagram of an electronic apparatus according to at least one embodiment of the disclosure.

At least one embodiment of the disclosure further provides an electronic apparatus. FIG. 6 is a schematic block diagram of an electronic apparatus according to at least one embodiment of the disclosure.

As shown in FIG. 6, an electronic apparatus includes a processor 601, a communication interface 602, a memory 603, and a communication bus 604. The processor 601, the communication interface 602, and the memory 603 may communicate with one another through the communication bus 604, and the processor 601, the communication interface 602, the memory 603, and other components may also communicate with one another through network connection.

Herein, the types and functions of the network are not limited in the disclosure. Note that the components of the electronic apparatus shown in FIG. 6 are only exemplary and are not restrictive, and the electronic apparatus may also include other components according to actual application needs.

In this embodiment, the memory 603 is configured for non-transitory storage of computer-readable instructions. The processor 601 is configured to implement the edge detection method according to any of the foregoing embodiments when executing computer-readable instructions. Specific implementation and related descriptive content of the steps of the edge detection method may be found with reference to the embodiments of the edge detection method, and description thereof is thus not provided herein.

Other implementation of the edge detection method implemented through executing computer-readable instructions stored in the memory 603 by the processor 601 is identical to the implementation mentioned in the foregoing method embodiments, and description thereof is thus not repeated herein.

The communication bus 604 may be a Peripheral Component Interconnection (PCI) bus or an Extended Industry Standard Architecture (EISA) bus and the like. The communication bus may be divided into address bus, data bus, control bus and so on. For ease of illustration, the figure is represented by only one thick line, but it does not mean that there is only one bus or one type of bus.

The communication interface 602 is configured to implement communication between the electronic apparatus and other apparatuses.

The processor 601 and the memory 603 may be provided on the server side (or the cloud side).

The processor 601 may control other components in the electronic apparatus to perform desired functions. The processor 601 may be a central processing unit (CPU), a network processing unit (NP), a tensor processor (TPU), or a graphics processing unit (GPU), and other devices with data processing capabilities and/or program execution capabilities, and the processor 601 may also be a digital signal processor (DSP), an application specific integrated circuit (ASIC), a field programmable gate array (FPGA) or other programmable logic devices, discrete gates, transistor logic devices, or discrete hardware components. The central processing unit (CPU) may be X86 or ARM architecture, etc.

The memory 603 may include any combination of one or more computer program products, and the computer program product may include various forms of computer-readable storage media, such as volatile memory and/or non-volatile memory. The volatile memory may include random access memory (RAM) and/or cache memory (cache), for example. The non-volatile memory may include, for example, read only memory (ROM), hard disk, erasable programmable read only memory (EPROM), portable compact disk read only memory (CD-ROM), USB memory, flash memory, etc. One or more computer-readable instructions may be stored on the computer-readable storage medium, and the processor 601 may run the computer-readable instructions to implement various functions of the electronic apparatus. Various application programs and various data may also be stored in the storage medium.

In some embodiments, the electronic apparatus may further include an image acquisition component. The image acquisition component is configured to acquire the input image of an object. The memory 603 is further configured to store the input image.

The image acquisition component may be a camera of a smart phone, a camera of a tablet computer, a camera of a personal computer, a lens of a digital camera, or a webcam.

In this embodiment, the input image may be an original image directly collected by the image acquisition component or an image which is obtained after the original image is processed.

Preprocessing may eliminate irrelevant information or noise information in the original image, so as to better process the input image. The preprocessing may include, for example, image expansion (data augment), image scaling, gamma correction, image enhancement, or noise reduction filtering on the original image.

Detailed description of edge detection executed by the electronic apparatus may be found with reference to the related description in the embodiments of the edge detection method and thus is not repeated herein.

Figure 7:
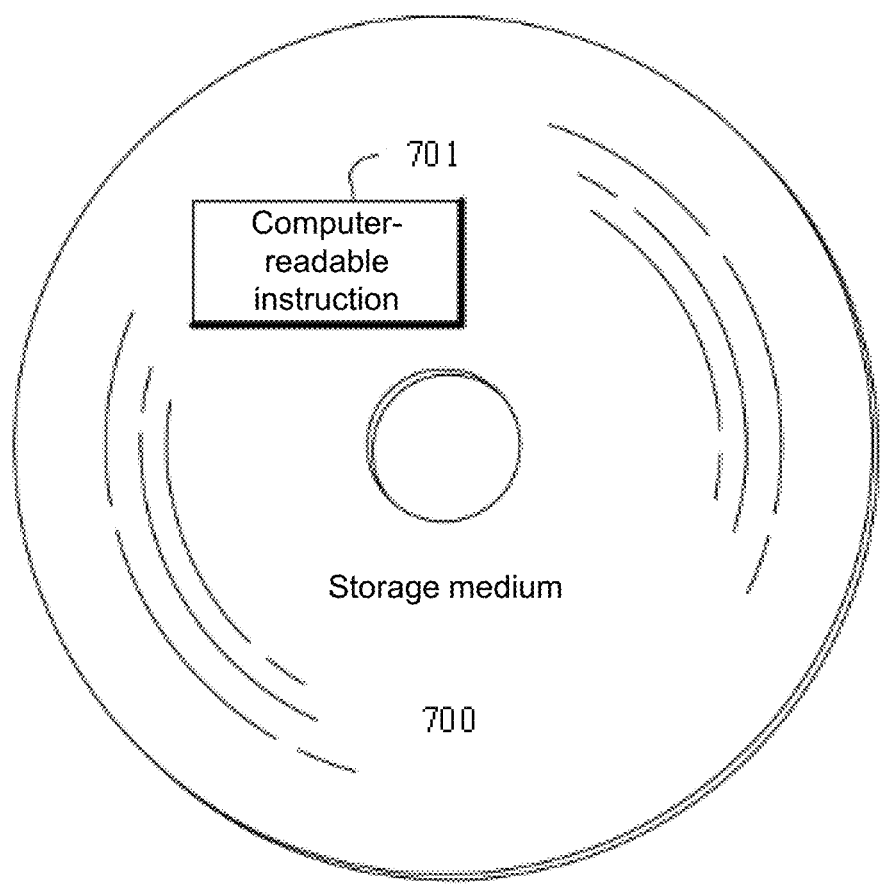
FIG. 7 is a schematic diagram of a non-transitory computer-readable storage medium according to at least one embodiment of the disclosure.

FIG. 7 is a schematic diagram of a non-transitory computer-readable storage medium according to at least one embodiment of the disclosure. For instance, as shown in FIG. 7, one or more computer-readable instructions 701 may be non-transitory stored on a storage medium 700. For instance, when the computer-readable instruction 701 is executed by a processor, one or more steps in the edge detection method described above may be executed.

The storage medium 700 may be applied in the electronic apparatus, for example, and the storage medium 700 may include the memory 603 in the electronic apparatus.

Description of the storage medium 700 may be found with reference to the description of the memory in the embodiments regarding the electronic apparatus and thus is not repeated herein.

Figure 8:
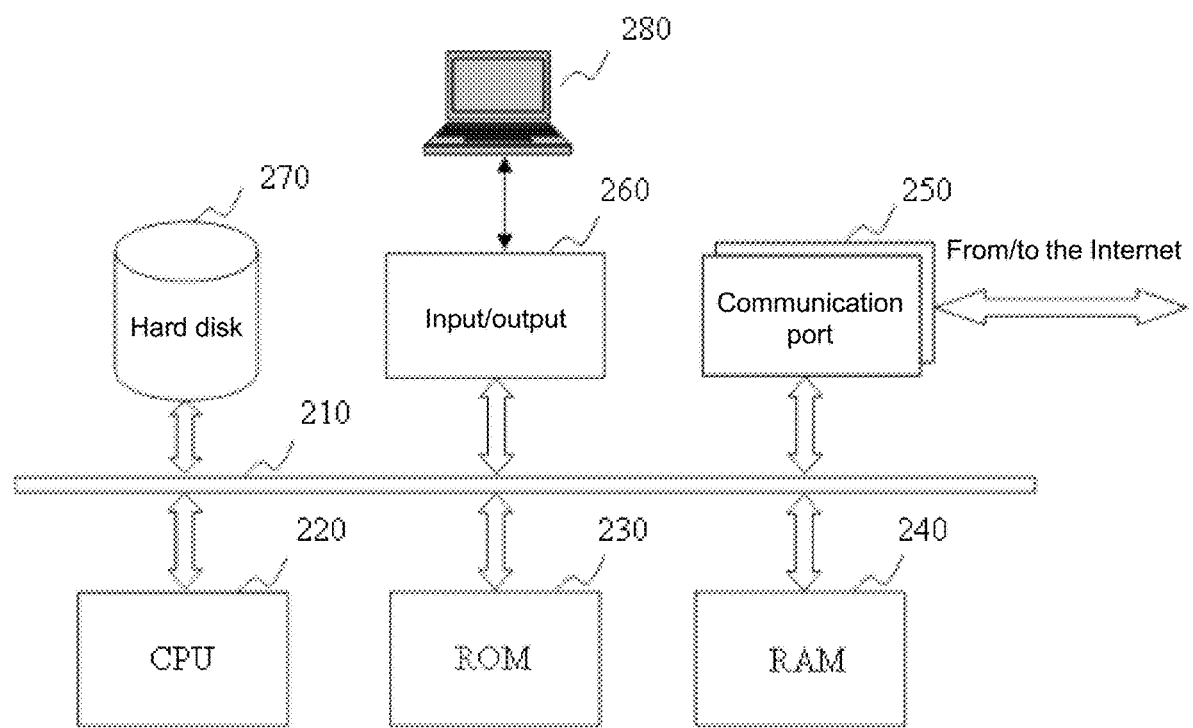
FIG. 8 is a schematic diagram of a hardware environment according to at least one embodiment of the disclosure.

FIG. 8 is a schematic diagram of a hardware environment according to at least one embodiment of the disclosure. The electronic apparatus provided by the disclosure may be applied to the Internet system.

The computer system provided in FIG. 8 may be used to implement the edge detection device and/or the electronic apparatus involved in the disclosure. Such a computer system may include a personal computer, notebook computer, tablet computer, mobile phone, personal digital assistant, smart glasses, smart watch, smart ring, smart helmet, and any smart portable device or wearable device. In this embodiment, a hardware platform including a user interface in the specific system is explained through a functional block diagram. This kind of computer apparatus may be a general-purpose computer apparatus or a special purpose computer apparatus. Both types of computer apparatuses may be used to implement the edge detection device and/or electronic apparatus in this embodiment. The computer system may implement any of the currently described components that implement the information required for edge detection. For example, a computer system may be realized by a computer apparatus through its hardware device, software program, firmware, and a combination thereof. For convenience, only one computer device is depicted in FIG. 7. However, the computer functions related to the information required to realize the edge detection described in this embodiment may be implemented by a group of similar platforms in a distributed manner to disperse the processing load of the computer system.

As shown in FIG. 8, the computer system may include the communication port 250, which is connected to a network for data communication. For instance, the computer system may send and receive information and data through the communication port 250. That is, the communication port 250 may implement wireless or wired communication between the computer system and other electronic apparatuses to exchange data. The computer system may also include a processor group 220 (that is, the processor described above) for executing program instructions. The processor group 220 may be formed by at least one processor (e.g., a CPU). The computer system may include an internal communication bus 210. The computer system may include different forms of program storage units and data storage units (i.e., the memory or storage medium described above), such as a hard disk 270, a read only memory (ROM) 230, and a random access memory (RAM) 240, and may include various data files that can be used to store computer processing and/or communication as well as possible program instructions executed by the processor group 220. The computer system may further include an input/output component 260, and the input/output component 260 is configured to implement input/output data flow between the computer system and other components (e.g., a user interface 280 and the like).

Generally, the following devices may be connected to the input/output component 260: an input device (e.g., a touch screen, a touch pad, a keyboard, a mouse, a camera, a microphone, an accelerometer, a gyroscope, etc.), an output device (e.g., a liquid crystal display (LCD), a speaker, a vibrator, etc.), a storage device (e.g., a magnetic tape, a hard disk, etc.), and a communication interface.

Although FIG. 8 shows a computer system with various devices, it should be understood that the computer system is not required to have all the devices shown. Alternatively, the computer system may have more or fewer devices.

Regarding the disclosure, the following is required to be explained.

(1) The accompanying drawings of the embodiments of the disclosure only refer to the structures related to the embodiments of the disclosure, and general design may be referenced for other structures.

(2) For clarity, in the accompanying drawings used to describe the embodiments of the disclosure, the thickness and size of layers or structures are exaggerated. It should be understood that when an element such as a layer, film, region, or substrate is referred to as being "on" or "under" another element, the element may be "directly" "on" or "under" the another element, or intervening elements may be presented therebetween.

(3) The embodiments of the disclosure and the features in the embodiments may be combined with each other to obtain new embodiments with absence of conflict.

The above are only specific implementation of the disclosure, but the protection scope of the disclosure is not limited thereto. The protection scope of the disclosure should be subject to the protection scope of the claims.

What is claimed is:

1. An edge detection method, comprising:
processing an input image to obtain a line drawing of grayscale contours in the input image, wherein the input image comprises an object with edges, and the line drawing comprises a plurality of lines;
merging the lines to obtain a plurality of reference boundary lines;
processing the input image through a first boundary region recognition model to obtain a plurality of boundary regions corresponding to the object with edges;
for each reference boundary line among the reference boundary lines, comparing the reference boundary line with the boundary regions and counting a number of pixel points on the reference boundary line belonging to the boundary regions to serve as a score of the reference boundary line to determine a plurality of scores corresponding to the reference boundary lines one-to-one;
determining a plurality of target boundary lines according to the reference boundary lines, the scores, and the boundary regions; and
determining edges of the object with edges in the input image according to the determined target boundary lines;
wherein the step of determining the target boundary lines according to the reference boundary lines, the scores of the reference boundary lines, and the boundary regions further comprises:
converting the boundary regions into a plurality of straight line groups, wherein the straight line groups correspond to the boundary regions one-to-one, and each of the straight line groups among the straight line groups comprises at least one straight line;
calculating a plurality of average slopes corresponding to the straight line groups one-to-one;
calculating slopes of the reference boundary lines;
for an $i^{th}$ reference boundary line among the reference boundary lines, determining whether a difference between the slope of the $i^{th}$ reference boundary line and the average slope among the average slopes corresponding to the $i^{th}$ reference boundary line is greater than a first slope threshold, wherein i is a positive integer, and i is less than or equal to a number of the reference boundary lines;

determining the $i^{th}$ reference boundary line is a target reference boundary line to determine a plurality of target reference boundary lines among the reference boundary lines in response to the difference between the slope of the $i^{th}$ reference boundary line and the average slope corresponding to the $i^{th}$ reference boundary line being lower than or equal to the first slope threshold;

determining a plurality of intermediate target boundary lines according to the scores of the reference boundary lines corresponding to the target reference boundary lines; and determining the target boundary lines according to the intermediate target boundary lines.

2. The edge detection method according to claim 1, wherein the step of comparing the reference boundary line with the boundary regions and counting the number of pixel points on the reference boundary line belonging to the boundary regions to serve as the score of the reference boundary line further comprises:

determining a boundary region matrix according to the boundary regions;

extending the reference boundary line to obtain an extended reference boundary line;

determining a line matrix according to the extended reference boundary line; and comparing the line matrix with the boundary region matrix and counting a number of pixel points on the extended reference boundary line belonging to the boundary region matrix to serve as the score of the reference boundary line, wherein sizes of the line matrix and the boundary region matrix are identical.

3. The edge detection method according to claim 2, wherein the step of determining the line matrix according to the extended reference boundary line further comprises:

mapping position information of the pixel points in the extended reference boundary line to an image matrix; and setting values corresponding to the pixel points in extended reference boundary line in the image matrix to a first value and setting values corresponding to pixel points other than the pixel points in extended reference boundary line in the image matrix to a second value to form the line matrix.

4. The edge detection method according to claim 1, wherein the boundary regions comprise a first boundary region, a second boundary region, a third boundary region, and a fourth boundary region, and the reference boundary lines comprise a first reference boundary line group corresponding to the first boundary region, a second reference boundary line group corresponding to the second boundary region, a third reference boundary line group corresponding to the third boundary region, and a fourth reference boundary line group corresponding to the fourth boundary region, wherein the edge detection method further comprises:

in response to differences between the slopes of all reference boundary lines in a selected reference boundary line group of the reference boundary lines and the average slope corresponding to the selected reference boundary line group being all greater than the first slope threshold, wherein the selected reference boundary line group is the first reference boundary line group, the second reference boundary line group, the third reference boundary line group, or the fourth reference boundary line group;

obtaining a selected boundary region corresponding to the selected reference boundary line group, wherein the selected boundary region is the first boundary region, the second boundary region, the third boundary region, or the fourth boundary region; and according to the straight line group corresponding to the selected boundary region, determining a median of the straight line group corresponding to the selected boundary region and determining the median as the target boundary line corresponding to the selected boundary region.

5. The edge detection method according to claim 1, wherein the step of determining the target boundary lines according to the intermediate target boundary lines further comprises:

for a $k^{th}$ intermediate target boundary line among the intermediate target boundary lines, performing a coincidence degree judgment on the $k^{th}$ intermediate target boundary line to determine whether the $k^{th}$ intermediate target boundary line is the target boundary line, wherein the step of performing the coincidence degree judgment on the $k^{th}$ intermediate target boundary line further comprises:

calculating a ratio of pixel points of the $k^{th}$ intermediate target boundary line falling into the boundary region corresponding to the $k^{th}$ intermediate target boundary line to all pixel points of the $k^{th}$ intermediate target boundary line, wherein k is a positive integer, and k is less than or equal to a number of the intermediate target boundary lines;

determining whether the ratio is greater than or equal to a ratio threshold;

determining the $k^{th}$ intermediate target boundary line is the target boundary line in response to the ratio being greater than or equal to the ratio threshold and performing the coincidence degree judgment on the intermediate target boundary lines to determine the target boundary lines; and deleting the $k^{th}$ intermediate target boundary line in response to the ratio being less than the ratio threshold and continuously performing the coincidence degree judgment on any intermediate target boundary line among the intermediate target boundary lines except the $k^{th}$ intermediate target boundary line.

6. The edge detection method according to claim 1, wherein the step of converting the boundary regions into the straight line groups further comprises:

applying a Hough transform to convert the boundary regions into the straight line groups.

7. The edge detection method according to claim 1, wherein the step of processing the input image to obtain the line drawing of grayscale contours in the input image further comprises:

processing the input image through an edge detection algorithm to obtain the line drawing of grayscale contours in the input image.

8. The edge detection method according to claim 1, wherein the step of processing the input image to obtain the line drawing of grayscale contours in the input image further comprises:

processing the input image through a second boundary region recognition model to obtain the boundary regions; and processing the boundary regions through an edge detection algorithm to obtain the line drawing of grayscale contours in the input image.

9. The edge detection method according to claim 1, wherein the reference boundary lines are divided into a plurality of reference boundary line groups corresponding to the boundary regions one-to-one, and each reference boundary line group among the reference boundary line groups comprises at least one reference boundary line, wherein the step of merging the lines to obtain the reference boundary lines comprises:

merging similar lines among the lines to obtain a plurality of initial merged line groups, wherein the initial merged line groups correspond to the boundary regions one-to-one, and each initial merged line group among the initial merged line groups comprises at least one initial merged line;

determining a plurality of boundary connecting lines according to the initial merged line groups, wherein the boundary connecting lines correspond to the boundary regions one-to-one, and the boundary connecting lines also correspond to the initial merged line groups one-to-one;

converting the boundary regions into the straight line groups;

calculating the average slopes corresponding to the straight line groups one-to-one;

calculating the slopes of the boundary connecting lines;

for a $b1^{th}$ boundary connecting line among the boundary connecting lines, determining whether a difference between the slope of the $b1^{th}$ boundary connecting line and the average slope among the average slopes corresponding to the $b1^{th}$ boundary connecting line is greater than a second slope threshold, wherein b1 is a positive integer, and b1 is less than or equal to a number of the boundary connecting lines;

serving the $b1^{th}$ boundary connecting line and the initial merged line in the initial merged line group corresponding to the $b1^{th}$ boundary connecting line as the reference boundary lines in the reference boundary line group corresponding to the boundary region corresponding to the $b1^{th}$ boundary connecting line in response to the difference between the slope of the $b1^{th}$ boundary connecting line and the average slope corresponding to the $b1^{th}$ boundary connecting line being less than or equal to the second slope threshold; and serving the initial merged line in the initial merged line group corresponding to the $b1^{th}$ boundary connecting line as the reference boundary line in the reference boundary line group corresponding to the boundary region corresponding to the $b1^{th}$ boundary connecting line in response to the difference between the slope of the $b1^{th}$ boundary connecting line and the average slope corresponding to the $b1^{th}$ boundary connecting line being greater than the second slope threshold to determine the reference boundary lines.

10. The edge detection method according to claim 9, wherein the step of merging the similar lines among the lines to obtain the initial merged line groups further comprises:

acquiring a plurality of long lines among the lines, wherein each long line among the long lines is a line whose length exceeds a length threshold;

obtaining a plurality of merged line groups according to the long lines, wherein each merged line group among the merged line groups comprises at least two successively adjacent long lines, and an angle between any two adjacent long lines in each merged line group is less than an angle threshold; and for each merged line group among the merged line groups, sequentially merging the long lines in the merged line group to obtain an initial merged line corresponding to the merged line group and merging the merged line groups to determine the initial merged lines in the initial merged line groups.

11. The edge detection method according to claim 9, wherein the step of determining the boundary connecting lines according to the initial merged line groups further comprises:

for a $b2^{th}$ initial merged line group among the initial merged line groups, sorting the initial merged lines in the $b2^{th}$ initial merged line group according to an arrangement direction of the initial merged lines in the $b2^{th}$ initial merged line group to determine a first initial merged line and a last initial merged line in the $b2^{th}$ initial merged line group; and connecting a start point of the first initial merged line and an end point of the last initial merged line to obtain the boundary connecting line corresponding to the $b2^{th}$ initial merged line group to determine the boundary connecting lines, wherein b2 is a positive integer, and b2 is less than or equal to a number of the initial merged line groups.

12. The edge detection method according to claim 1, comprising:

obtaining a plurality of intersection points of the target boundary lines and performing perspective transformation on regions determined by the intersection points and the target boundary lines to obtain a front view of the object with edges in the input image.

13. An edge detection device, comprising:

an acquisition circuit, configured for processing an input image to obtain a line drawing of grayscale contours in the input image, wherein the input image comprises an object with edges, and the line drawing comprises a plurality of lines;

a merging circuit, configured for merging the lines to obtain a plurality of reference boundary lines;

a recognition circuit, configured for processing the input image through a first boundary region recognition model to obtain a plurality of boundary regions corresponding to the object with edges;

a score calculation circuit, for each reference boundary line among the reference boundary lines, the score calculation circuit being configured for comparing the reference boundary line with the boundary regions and counting a number of pixel points on the reference boundary line belonging to the boundary regions to serve as a score of the reference boundary line to determine a plurality of scores corresponding to the reference boundary lines one-to-one;

a first determination circuit, configured for determining a plurality of target boundary lines according to the reference boundary lines, the scores, and the boundary regions; and a second determination circuit, configured for determining edges of the object with edges according to the determined target boundary lines;

wherein the first determination circuit determines the target boundary lines according to the reference boundary lines, the scores of the reference boundary lines, and the boundary regions, and the first determination circuit is further configured for:

converting the boundary regions into a plurality of straight line groups, wherein the straight line groups correspond to the boundary regions one-to-one, and each of the straight line groups among the straight line groups comprises at least one straight line;

calculating a plurality of average slopes corresponding to the straight line groups one-to-one;

calculating slopes of the reference boundary lines;

for an $i^{th}$ reference boundary line among the reference boundary lines, determining whether a difference between the slope of the $i^{th}$ reference boundary line and the average slope among the average slopes corresponding to the $i^{th}$ reference boundary line is greater than a first slope threshold, wherein i is a positive integer, and i is less than or equal to a number of the reference boundary lines;

determining the $i^{th}$ reference boundary line is a target reference boundary line to determine a plurality of target reference boundary lines among the reference boundary lines in response to the difference between the slope of the $i^{th}$ reference boundary line and the average slope corresponding to the $i^{th}$ reference boundary line being lower than or equal to the first slope threshold;

determining a plurality of intermediate target boundary lines according to the scores of the reference boundary lines corresponding to the target reference boundary lines; and determining the target boundary lines according to the intermediate target boundary lines.

14. The edge detection device according to claim 13, wherein the score calculation circuit compares the reference boundary line with the boundary regions and counts and treats the number of pixel points on the reference boundary line belonging to the boundary regions as the score of the reference boundary line, and the score calculation circuit is further configured for:

determining a boundary region matrix according to the boundary regions;

extending the reference boundary line to obtain an extended reference boundary line;

determining a line matrix according to the extended reference boundary line; and comparing the line matrix with the boundary region matrix and counting a number of pixel points on the extended reference boundary line belonging to the boundary region matrix to serve as the score of the reference boundary line, wherein sizes of the line matrix and the boundary region matrix are identical.

15. The edge detection device according to claim 13, wherein the boundary regions comprise a first boundary region, a second boundary region, a third boundary region, and a fourth boundary region, and the reference boundary lines comprise a first reference boundary line group corresponding to the first boundary region, a second reference boundary line group corresponding to the second boundary region, a third reference boundary line group corresponding to the third boundary region, and a fourth reference boundary line group corresponding to the fourth boundary region, the first determination circuit is further configured for:

in response to differences between the slopes of all reference boundary lines in a selected reference boundary line group of the reference boundary lines and the average slope corresponding to the selected reference boundary line group being all greater than the first slope threshold, wherein the selected reference boundary line group is the first reference boundary line group, the second reference boundary line group, the third reference boundary line group, or the fourth reference boundary line group;

obtaining a selected boundary region corresponding to the selected reference boundary line group, wherein the selected boundary region is the first boundary region, the second boundary region, the third boundary region, or the fourth boundary region; and according to the straight line group corresponding to the selected boundary region, determining a median of the straight line group corresponding to the selected boundary region and determining the median as the target boundary line corresponding to the selected boundary region.

16. The edge detection device according to claim 13, wherein the first determination module circuit determines the target boundary lines according to the intermediate target boundary lines, and the first determination circuit is further configured for:

for a $k^{th}$ intermediate target boundary line among the intermediate target boundary lines, performing a coincidence degree judgment on the $k^{th}$ intermediate target boundary line to determine whether the $k^{th}$ intermediate target boundary line is the target boundary line, wherein the step of performing the coincidence degree judgment on the $k^{th}$ intermediate target boundary line further comprises:

calculating a ratio of pixel points of the $k^{th}$ intermediate target boundary line falling into the boundary region corresponding to the $k^{th}$ intermediate target boundary line to all pixel points of the $k^{th}$ intermediate target boundary line, wherein k is a positive integer, and k is less than or equal to a number of the intermediate target boundary lines;

determining whether the ratio is greater than or equal to a ratio threshold;

determining the $k^{th}$ intermediate target boundary line is the target boundary line in response to the ratio being greater than or equal to the ratio threshold and performing the coincidence degree judgment on the intermediate target boundary lines to determine the target boundary lines; and deleting the $k^{th}$ intermediate target boundary line in response to the ratio being less than the ratio threshold and continuously performing the coincidence degree judgment on any intermediate target boundary line among the intermediate target boundary lines except the $k^{th}$ intermediate target boundary line.

17. The edge detection device according to claim 13, wherein the reference boundary lines are divided into a plurality of reference boundary line groups corresponding to the boundary regions one-to-one, and each reference boundary line group among the reference boundary line groups comprises at least one reference boundary line, the merging circuit merges the lines to obtain the reference boundary lines, and the merging circuit is further configured for:

merging similar lines among the lines to obtain a plurality of initial merged line groups, wherein the initial merged line groups correspond to the boundary regions one-to-one, and each initial merged line group among the initial merged line groups comprises at least one initial merged line;

determining a plurality of boundary connecting lines according to the initial merged line groups, wherein the boundary connecting lines correspond to the boundary regions one-to-one, and the boundary connecting lines also correspond to the initial merged line groups one-to-one;

converting the boundary regions into the straight line groups;

calculating the average slopes corresponding to the straight line groups one-to-one;

calculating the slopes of the boundary connecting lines;

for a $b1^{th}$ boundary connecting line among the boundary connecting lines, determining whether a difference between the slope of the $b1^{th}$ boundary connecting line and the average slope among the average slopes corresponding to the $b1^{th}$ boundary connecting line is greater than a second slope threshold, wherein b1 is a positive integer, and b1 is less than or equal to a number of the boundary connecting lines;

serving the $b1^{th}$ boundary connecting line and the initial merged line in the initial merged line group corresponding to the $b1^{th}$ boundary connecting line as the reference boundary lines in the reference boundary line group corresponding to the boundary region corresponding to the $b1^{th}$ boundary connecting line in response to the difference between the slope of the $b1^{th}$ boundary connecting line and the average slope corresponding to the $b1^{th}$ boundary connecting line being less than or equal to the second slope threshold; and serving the initial merged line in the initial merged line group corresponding to the $b1^{th}$ boundary connecting line as the reference boundary line in the reference boundary line group corresponding to the boundary region corresponding to the $b1^{th}$ boundary connecting line in response to the difference between the slope of the $b1^{th}$ boundary connecting line and the average slope corresponding to the $b1^{th}$ boundary connecting line being less than the second slope threshold to determine the reference boundary lines.

18. An electronic apparatus, comprising a processor and a memory,
wherein the memory is configured to store a computer-readable instruction,
wherein the processor is configured to implement the steps of the edge detection method according to claim 1 when executing the computer-readable instruction.

19. A non-transitory computer-readable storage medium, wherein the non-transitory computer-readable storage medium is configured for non-transitory storage of a computer-readable instruction, and the computer-readable instruction is configured to implement the steps of the edge detection method according to claim 1 when being executed by a processor.

* * * * *